(12) United States Patent
Minowa et al.

(10) Patent No.: US 7,934,617 B2
(45) Date of Patent: May 3, 2011

(54) CONTAINER HAVING A DETACHABLE LID

(75) Inventors: Takahiro Minowa, Wako (JP); Kazuo Ando, Wako (JP); Hiroyuki Tajima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1318 days.

(21) Appl. No.: 11/474,481

(22) Filed: Jun. 26, 2006

(65) Prior Publication Data
US 2007/0034631 A1 Feb. 15, 2007

(30) Foreign Application Priority Data

Aug. 9, 2005 (JP) .................................. 2005-231218

(51) Int. Cl.
*B65D 45/32* (2006.01)
(52) U.S. Cl. ............ 220/320; 210/85; 210/94; 210/232; 210/440; 210/443; 220/298
(58) Field of Classification Search .................... 210/85, 210/94, 232, 440, 442, 443, 450; 220/298, 220/320
See application file for complete search history.

(56) References Cited

U.S. PATENT DOCUMENTS 4,061,572 A * 12/1977 Cohen et al. .................. 210/206

FOREIGN PATENT DOCUMENTS

| JP | 35-002182 | 2/1935 |
|---|---|---|
| JP | 50-064270 | 6/1975 |
| JP | 56-002819 A | 1/1981 |
| JP | 7-251009 | 10/1995 |
| JP | 10-047483 A | 2/1998 |
| JP | 2002-122014 | 4/2002 |
| WO | WO 93/14858 A1 | 8/1993 |

* cited by examiner

*Primary Examiner* — Anthony Stashick
*Assistant Examiner* — Elizabeth Volz
(74) *Attorney, Agent, or Firm* — Arent Fox LLP

(57) ABSTRACT

A container is provided comprising a casing, a set plate closing the lower end of the casing and a lock ring that fastens the set plate onto the casing. The casing is provided with a radial outer flange formed around an open end of the main body thereof. The radial outer flange and the outer periphery of the set plate are each provided with three stop projections and three notches. The radial outer flange is further provided with three biasing projections and the outer periphery of the set plate is further provided with three engagement rims. The members of each threesome are arranged at a regular angular interval and each threesome is arranged at different angular phase positions from those of the other threesomes. The outer periphery of the lock ring is provided with three engagement lugs that project inwardly at a regular angular interval.

9 Claims, 26 Drawing Sheets

CONTAINER HAVING A DETACHABLE LID

TECHNICAL FIELD

The present invention relates to a container having a detachable lid that is suitable for use as a reusable oil filter, and in particular to a technology that improves the efficiency in disassembling and assembling an oil filter and reduces the manufacturing cost and weight of an oil filter.

BACKGROUND OF THE INVENTION

An internal combustion engine is typically equipped with a lubrication system that comprises such components as an oil pump, oil filter, oil strainer and relief valve for feeding pressurizing engine oil to various parts of the engine to lubricate the valve mechanism and cool the pistons. There are various types of oil filters, and a spin-on type oil filter is used in a majority of small to medium sized engines commonly used for passenger vehicles. A spin-on type oil filter comprises a filter element typically formed by folding filtering paper and an enclosed casing, and is typically screwed into a threaded boss projecting typically from a side of a crankcase.

Conventionally, most spin-on type oil filters have been offered as disposable type oil filters. However, when removed from an engine at the end of a service life, a disposable oil filter cannot be easily separated into a filter element and a casing for garbage recycling, and it is desirable to reuse the casing for the preservation of natural resources. Therefore, proposals have been made to use reusable oil filters using a replaceable filter element instead of disposable oil filters. In a reusable oil filter, it is necessary that a casing accommodating a filter element and relief valve is detachably fastened to a set plate provided with a female thread for mounting on an engine and defining oil passages for the engine oil.

Reusable oil filters were commonly used before the disposable oil filters gained popularity, but were taken over by disposable oil filters because replacing filter elements is a very messy process that could result in a good deal of oil spill. A known method for fastening a casing of a reusable oil filter to a set plate uses a thread structure that includes a male thread formed around the set plate and a ring nut fitted on the casing and provided with a female thread that can be threaded with the male thread of the set plate (see Japanese patent No. 3076495 and Japanese patent laid-open publication No. 2002-122014, for instance)

Such a thread structure requires the ring nut to be turned several times by using a fastening tool (such as a large-diameter ring wrench) when assembling the oil filter. Therefore, a considerable time is required for replacing oil filter elements. Also, the fastening torque must be properly controlled for the oil filter to be assembled in a reliable manner, and this adds to the work hours that is required for the assembly work. To ensure an adequate fastening force to secure the set plate, the male thread formed around the set plate is required to have a certain length, and this increases the size and weight of the container having a detachable lid.

BRIEF SUMMARY OF THE INVENTION

In view of such problems of the prior art, a primary object of the present invention is to provide a container having a detachable lid which can improve the disassembling/assembling efficiency.

A second object of the present invention is to provide a container suitable for use as a reusable oil filter that is light in weight and compact in size.

The present invention accomplish such and other objects by providing a container having a detachable lid, comprising: a cup-shaped cylindrical casing having a closed upper end, an open lower end and a radial outer flange extending from the open lower end thereof; a disk-shaped lid closing the open end of the casing and provided with a plurality of engagement portions provided on an outer periphery of the lid at a prescribed angular interval; and an annular lock ring having a flange pressuring portion that engages an end surface of the radial outer flange to pressurize the radial outer flange against a peripheral part of the lid and a plurality of engagement portions formed at positions of the lock ring corresponding to the engagement portions of the lid; wherein each engagement portion of the lock ring engages a corresponding one of the engagement portions of the lid, and one of the mutually engaging engagement portions of the lock ring and lid is provided with a guide slot while the other of the mutually engaging engagement portions of the lock ring and lid is provided with an engagement projection received in the guide slot, the guide slot being provided with a first section extending substantially in parallel with an axial line of the casing and a second section extending substantially laterally from the first section.

Thereby, the casing can be fastened to and separated from the lid by turning the lock ring by a prescribed angle substantially less than 360 degrees (which may vary depending on the number of the engagement portions and may be about 30 degrees, for instance) by using a tool or by hand so that the work efficiency can be improved. Because the casing and lid are fastened to each other with a fixed securing force, it is possible to do away with the management of the fastening torque which was necessary in the conventional arrangement using a thread engagement. Preferably, the engagement portions of the lock ring are arranged at a regular angular interval, and the engagement portions of the lid are arranged at a same angular interval so that the lock ring and lid can be secured to each other at any of a plurality of positions at which the engagement portions of the lid align with the engagement portions of the lock ring.

According to a preferred embodiment of the present invention, the lock ring comprises an annular peripheral wall extending downward from an outer edge of the flange pressuring portion of the lock ring and having an inner diameter greater than outer diameters of the radial outer flange and lid, and the engagement portions of the lock ring comprises engagement projections projecting radially inwardly from an inner circumferential surface of the peripheral wall; the radial outer flange being provided with notches that permit passage of the engagement projections of the lock ring in an axial direction; the engagement portions of the lid comprising the guide slots, the first and second sections of each guide slot being defined by a notch and a rim formed in a periphery of the lid, respectively.

Thereby, by fitting the lock ring around the casing, moving toward the radial outer flange of the casing and joining the lock ring with the lid in the manner of a bayonet connection, the lid is firmly joined to the casing. Because the lid can be of a simple structure which can be made by forging or stamp forming metallic material, the lid can be manufactured relatively easily and at a low cost.

An upper surface of each engagement projection and a lower surface of each rim are substantially perpendicular to an axial line of the casing, or, alternatively, an upper surface of each engagement projection and a lower surface of each rim are defined by planes that are slanted downward toward the adjacent notch of the lid. Either arrangement may be selected depending on the preference for the ease of manufacture or reliability in the joint between the casing and lid. In either case, when the casing and lid are subjected to a force that tends to separate them away from each other, such a force would not produce a component that tends to release the engagement between the engagement portions of the lock ring and the engagement portions of the lid so that the state of engagement can be easily maintained. Thereby, an inadvertent rotation can be avoided, and the state of engagement can be easily maintained.

If the radial outer flange is provided with a plurality of biasing projections on a lower surface thereof, for instance by embossing the material of the flange, at a regular angular interval to abut a periphery of the lid, preferably so as to abut the corresponding rims of the lid, the biasing force that the biasing projections produce when compressed provides an added reliability in the joint between the casing and lid.

According to a particularly preferred embodiment of the present invention, the radial outer flange is provided with at least one stop projection, and the lid is provided with a stop recess that receives the stop projection so as to join the casing and lid in a rotational fast manner. Thereby, the casing and lid plate are held together in a rotationally fast manner, the fastening of the lock ring onto the lid can be accomplished by holding the casing and lock ring and twisting them relative to each other. In particular, if the casing and lock ring may be each provided with a tool engaging surfaces on an outer periphery thereof for the convenience of assembly work, the fastening process can be facilitated by using a suitable tool.

According to a preferred embodiment of the present invention, the casing is made of stamp formed steel plate and the open end thereof comprises a double walled portion formed by folding back the steel plate of the open end back onto an outer surface of a main part of the casing, preferably without leaving any gap, the radial outer flange being formed as an extension of the folded back steel plate. Further, preferably, the lid is provided with a concentric annular seal support wall projecting upwardly and located slightly inwardly of an outer periphery of the lid, and an annular seal is interposed between an outer circumferential surface of the seal support wall of the lid and an inner circumferential surface of the double walled portion of the casing. Also, the lid may be provided with an annular upright peripheral wall extending upwardly and closely surrounding the outer circumferential surface of the double walled portion of the casing to restrain the deformation of the open end of the casing from outside.

Thereby, the open end of the casing which is particularly prone to deformation owing not to the shape of the casing can be favorably reinforced at low cost. Minimizing the deformation of this part is particularly important because the inner circumferential surface of the open end of the casing normally serves as a seal surface. For minimizing the part of the open end of the casing that provides a seal surface, the radial outer flange may align with a part of the annular seal with respect to an axial direction. For the same purpose, the peripheral wall may at least partly overlap with the annular seal with respect to an axial direction.

According to a preferred embodiment of the present invention, each rim of the lid is provided adjacent to a corresponding one of the notches of the lid, and a circumferential end of the rim remote from the notch is provided with a downwardly extending wall that limits a movement of the corresponding engagement projection of the lock ring.

Thereby, the rotational angle by which the lock ring must be turned relative to the lid or casing to complete the fastening process can be minimized, and the downwardly extending wall limits the angle prevents an excessive rotation of the lock ring.

According to another aspect of the present invention, the engagement portions of the lid comprise pins extending radially outward, and the lock ring comprises an annular peripheral wall extending downward from an outer edge of the flange pressuring portion of the lock ring and having an inner diameter greater than outer diameters of the radial outer flange and lid, the engagement portions of the lock ring comprising the guide slots; the first section of each guide slot comprising a substantially axial slot extending from a lower edge of the peripheral wall of the lock ring, the second section of the guide slot comprising a substantially lateral slot extending from an upper end of the axial slot.

According to yest another aspect of the present invention, the lock ring comprises an annular peripheral wall extending downward from an outer edge of the flange pressuring portion of the lock ring and having an inner diameter greater than outer diameters of the radial outer flange and lid, and the engagement portions of the lock ring comprise pins extending radially inward from the peripheral wall, the engagement portions of the lid comprising the guide slots; the first section of each guide slot comprising a substantially axial slot extending from an upper end of a peripheral part of the lid, the second section of the guide slot comprising a substantially lateral slot extending from a lower end of the axial slot.

The casing is preferably made of stamp formed steel plate, but may also be made of die cast metallic material or injection molded plastic material. In such a case, the radial flange may be easily provided slightly above the open lower end of the casing. The present invention is particularly advantageous when it is applied to an oil filter. In such a case, a filter element is received in the casing so as to divide an interior of the casing into two separate chambers, and the lid which in such a case consists of a set plate is provided with an inflow passage communicating with one of the chambers and an outflow passage communicating with the other chamber.

BRIEF DESCRIPTION OF THE DRAWINGS

Now the present invention is described in the following with reference to the appended drawings, in which.

DETAILED DESCRIPTION OF THE PREFERRED EMBODIMENTS

First Embodiment

Figure 1:
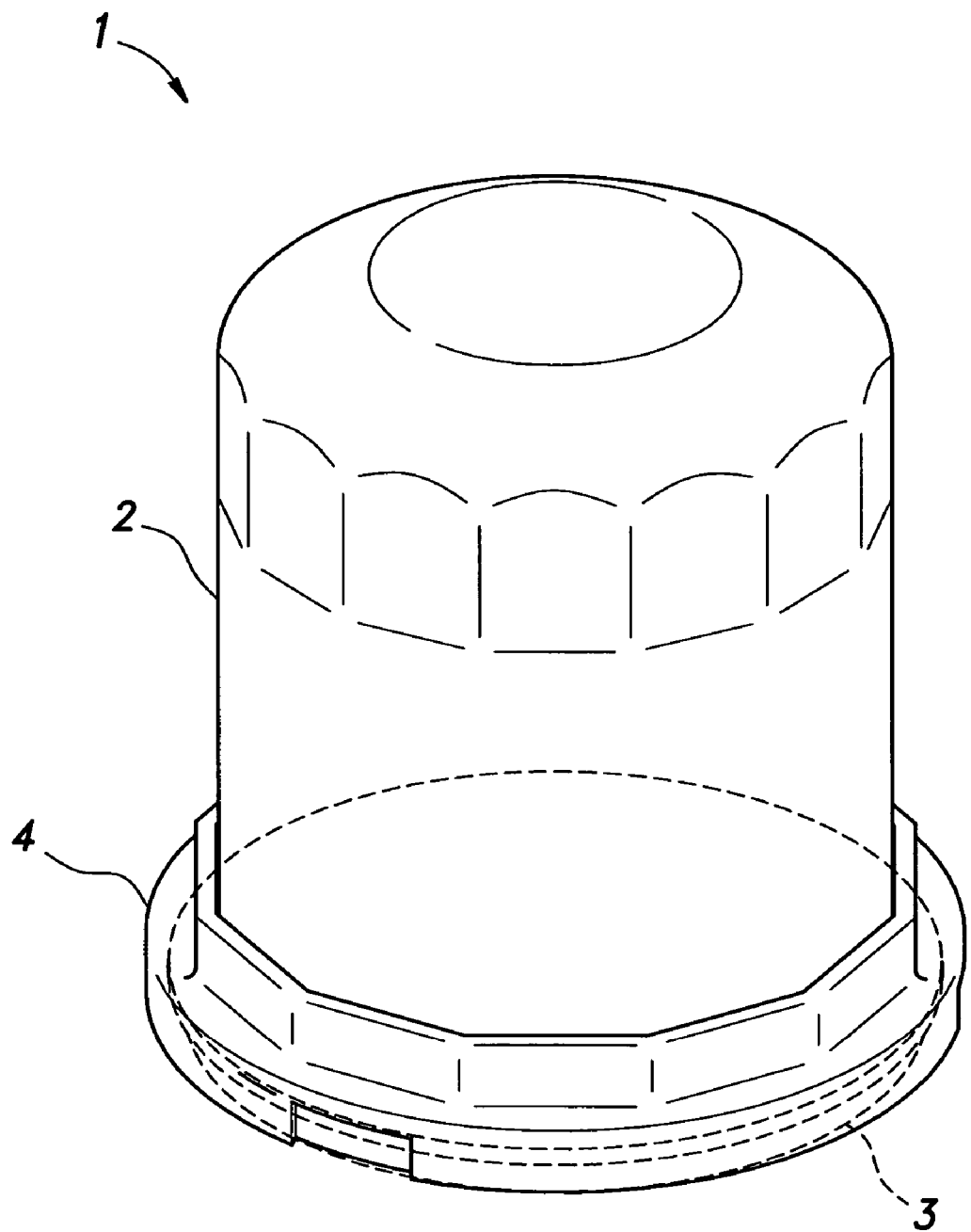
FIG. 1 is a perspective view of the oil filter of the first embodiment.
Figure 2:
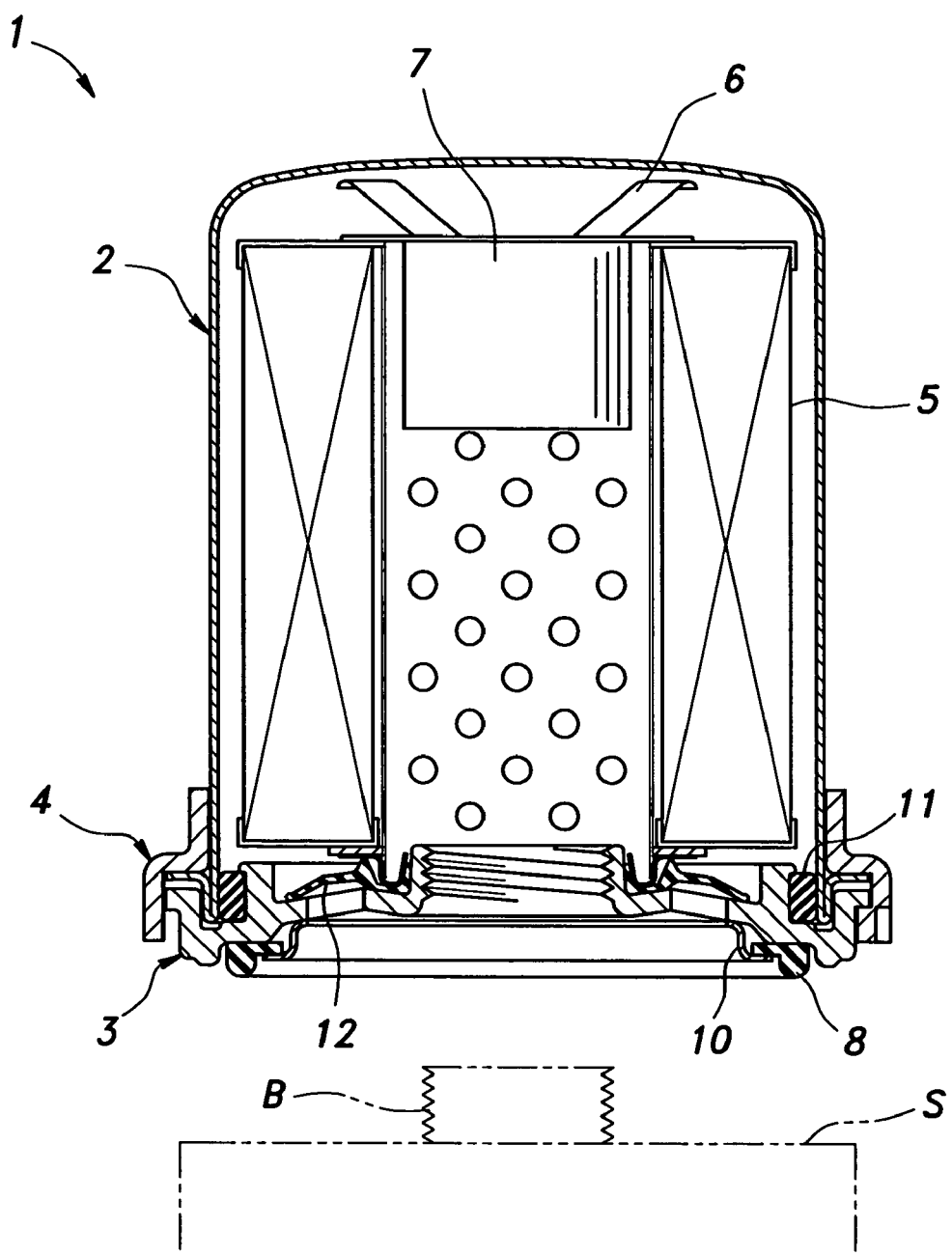
FIG. 2 is a vertical sectional view of the oil filter of the first embodiment.
Figure 3:
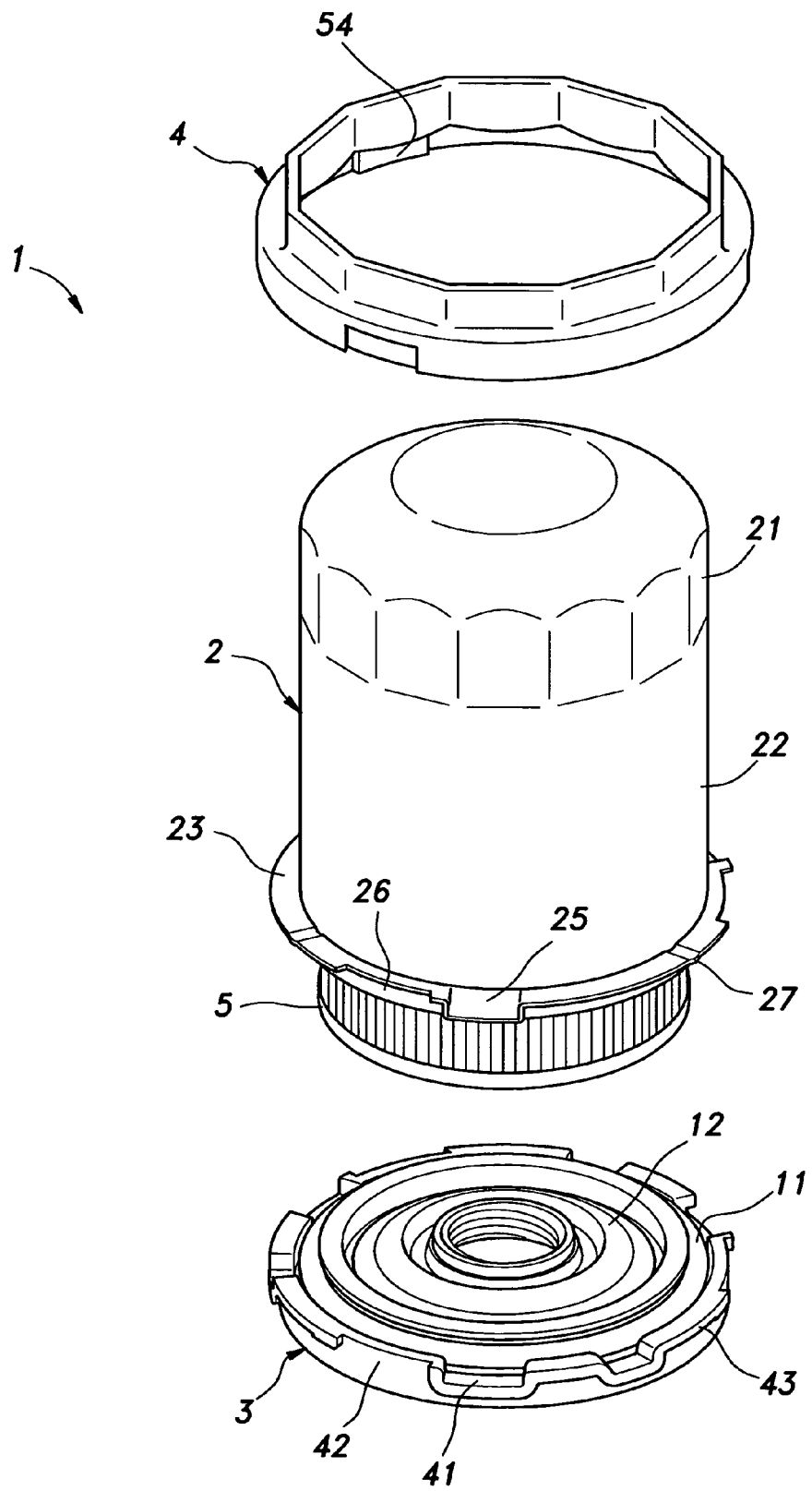
FIG. 3 is an exploded perspective view of the oil filter of the first embodiment.
Figure 4:
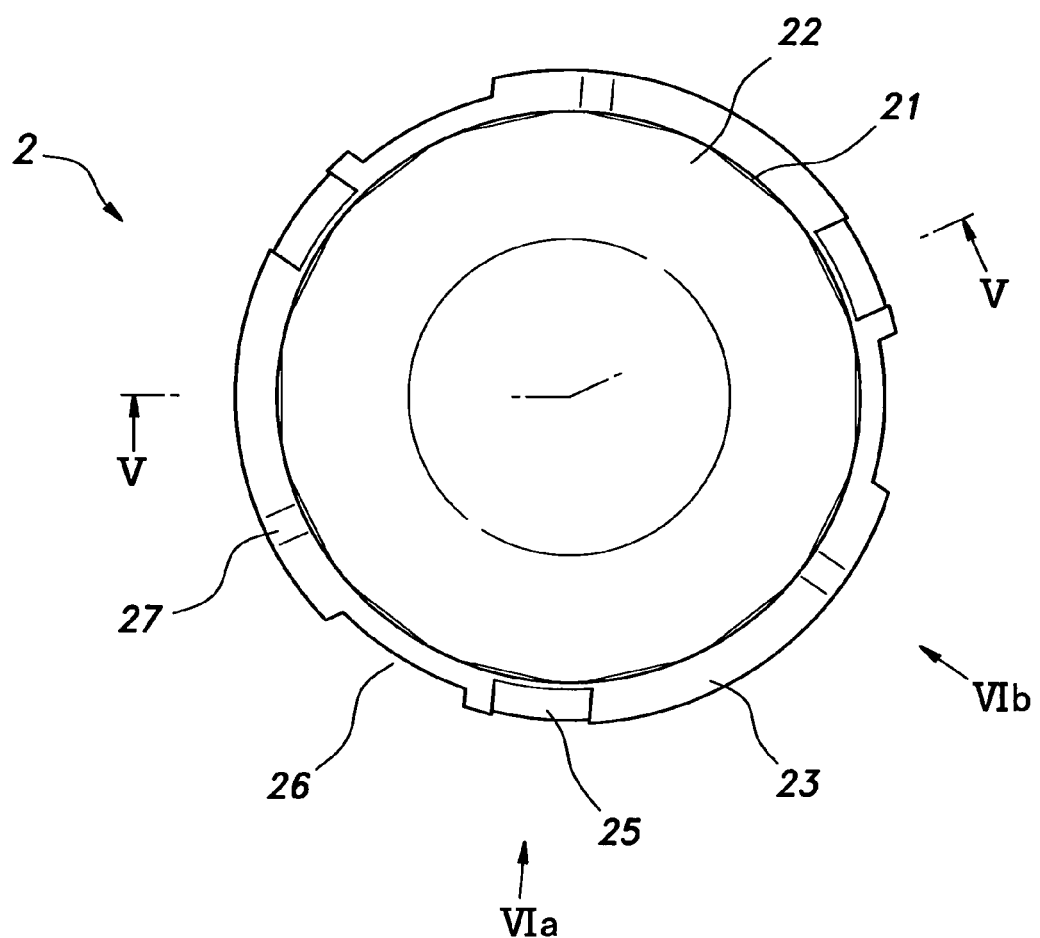
FIG. 4 is a plan view of the casing of the first embodiment.
Figure 5:
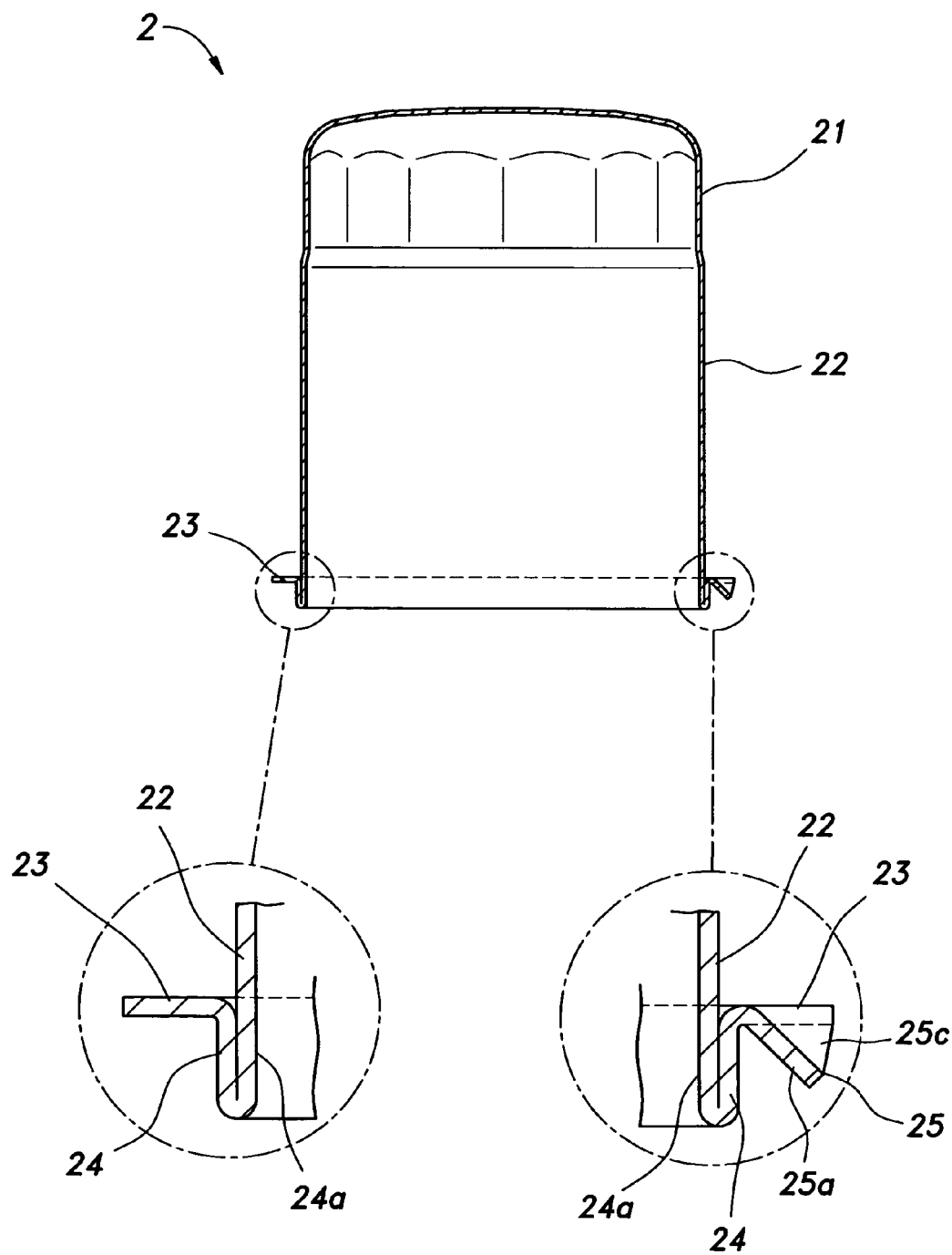
FIG. 5 is a sectional view taken along line V-V of FIG. 4.
Figure 6A:
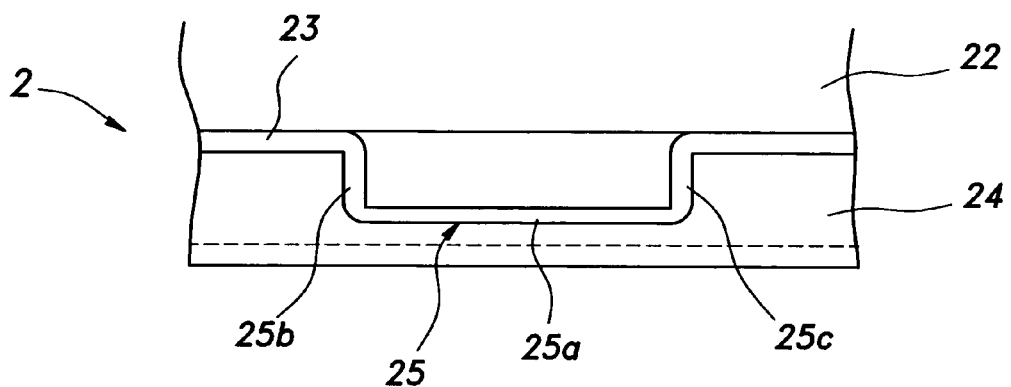
FIGS. 6a and 6b are end views as seen in the directions indicated by arrows VIa and VIb of FIG. 4.
Figure 6B:
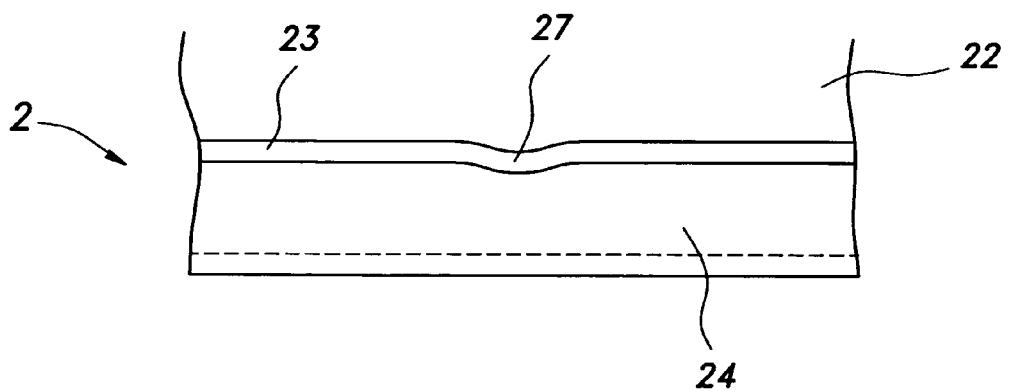
Figure 7:
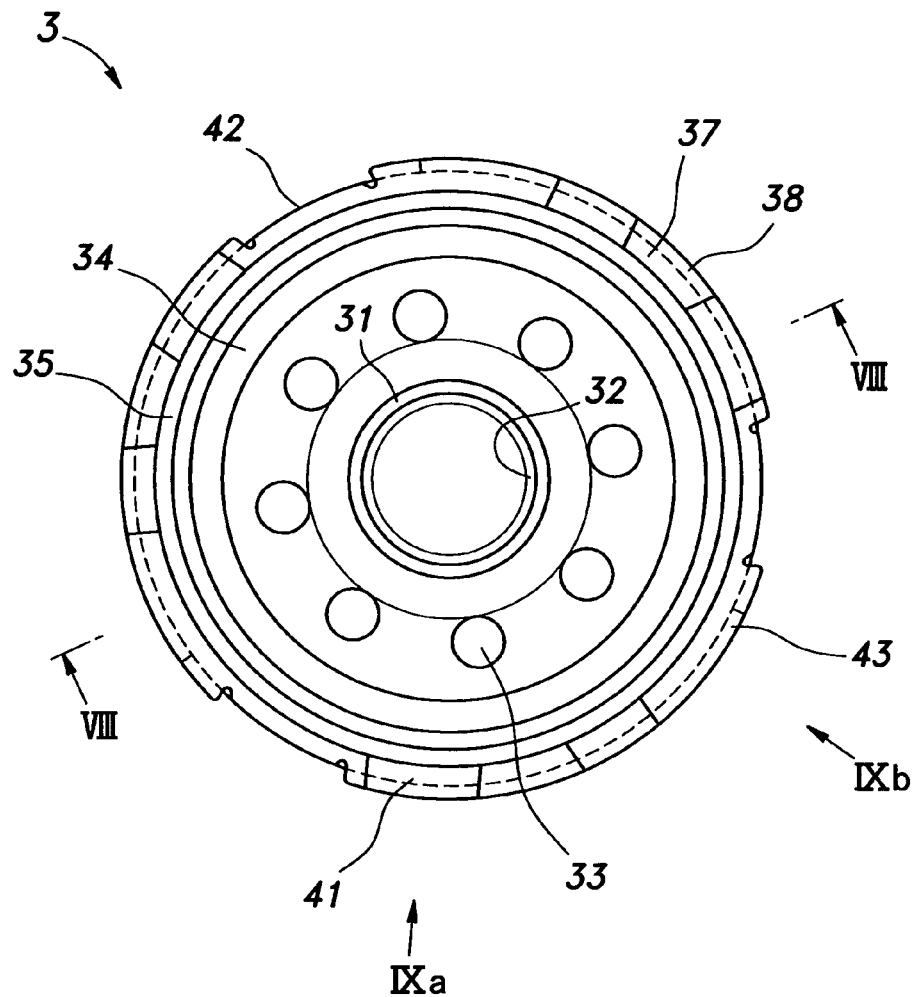
FIG. 7 is a plan view of the set plate of the first embodiment.
Figure 8:
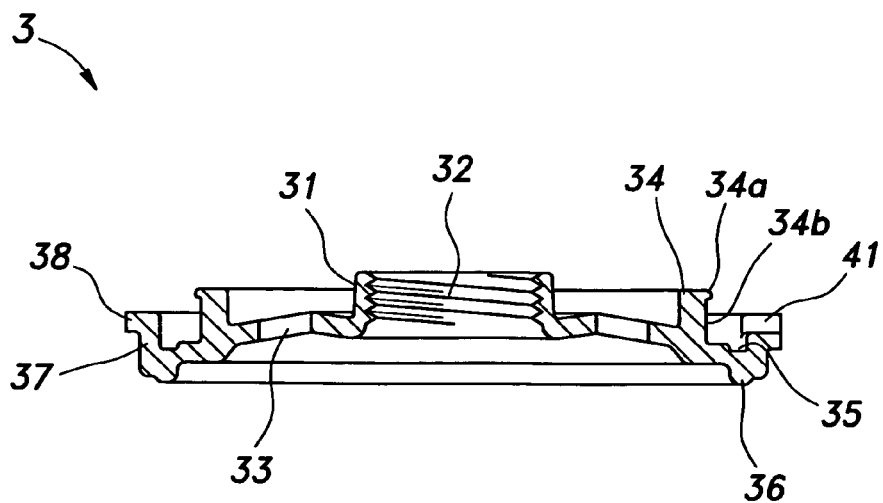
FIG. 8 is a sectional view taken along line VIII-VII of FIG. 7.
Figure 9A:
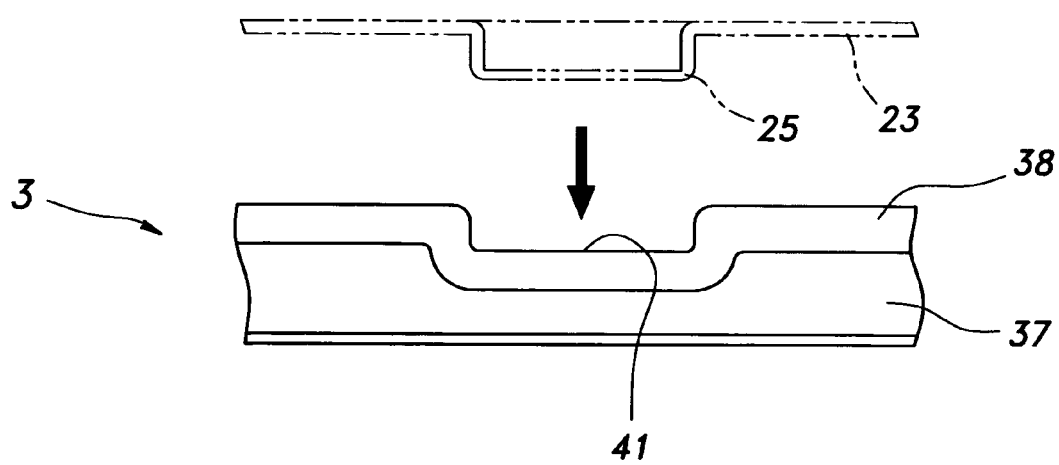
FIGS. 9a and 9b are end views as seen in the directions indicated by arrows IXa and IXb of FIG. 7.
Figure 9B:
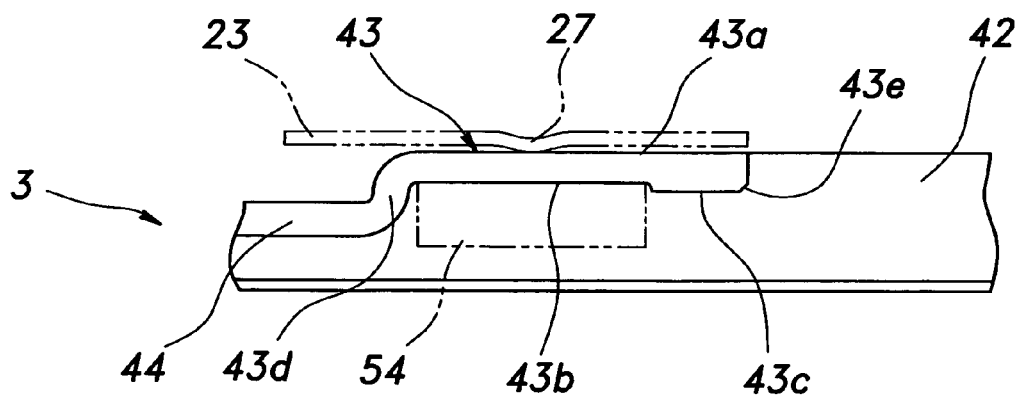
Figure 10:
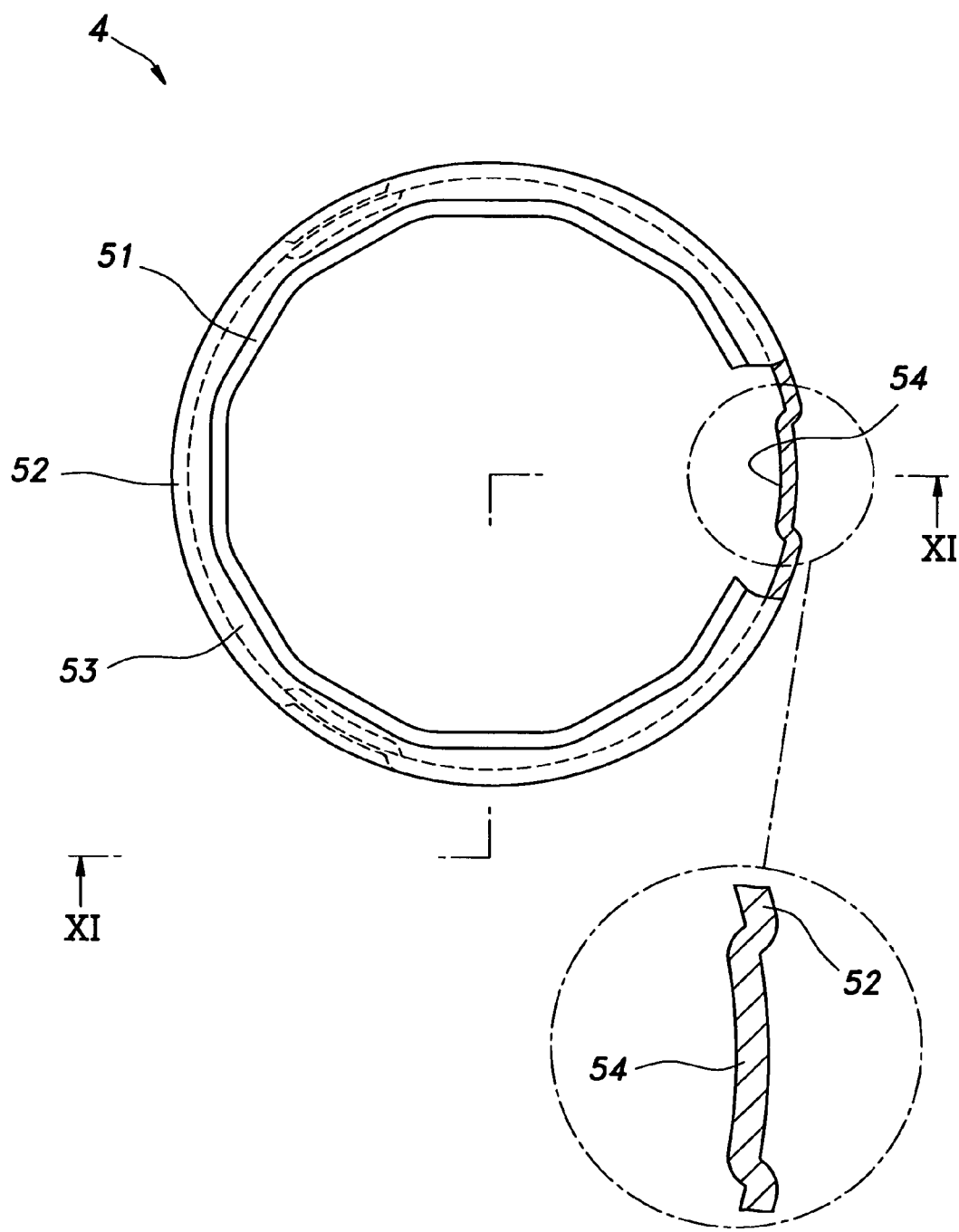
FIG. 10 is a plan view of the lock ring of the first embodiment.
Figure 11:
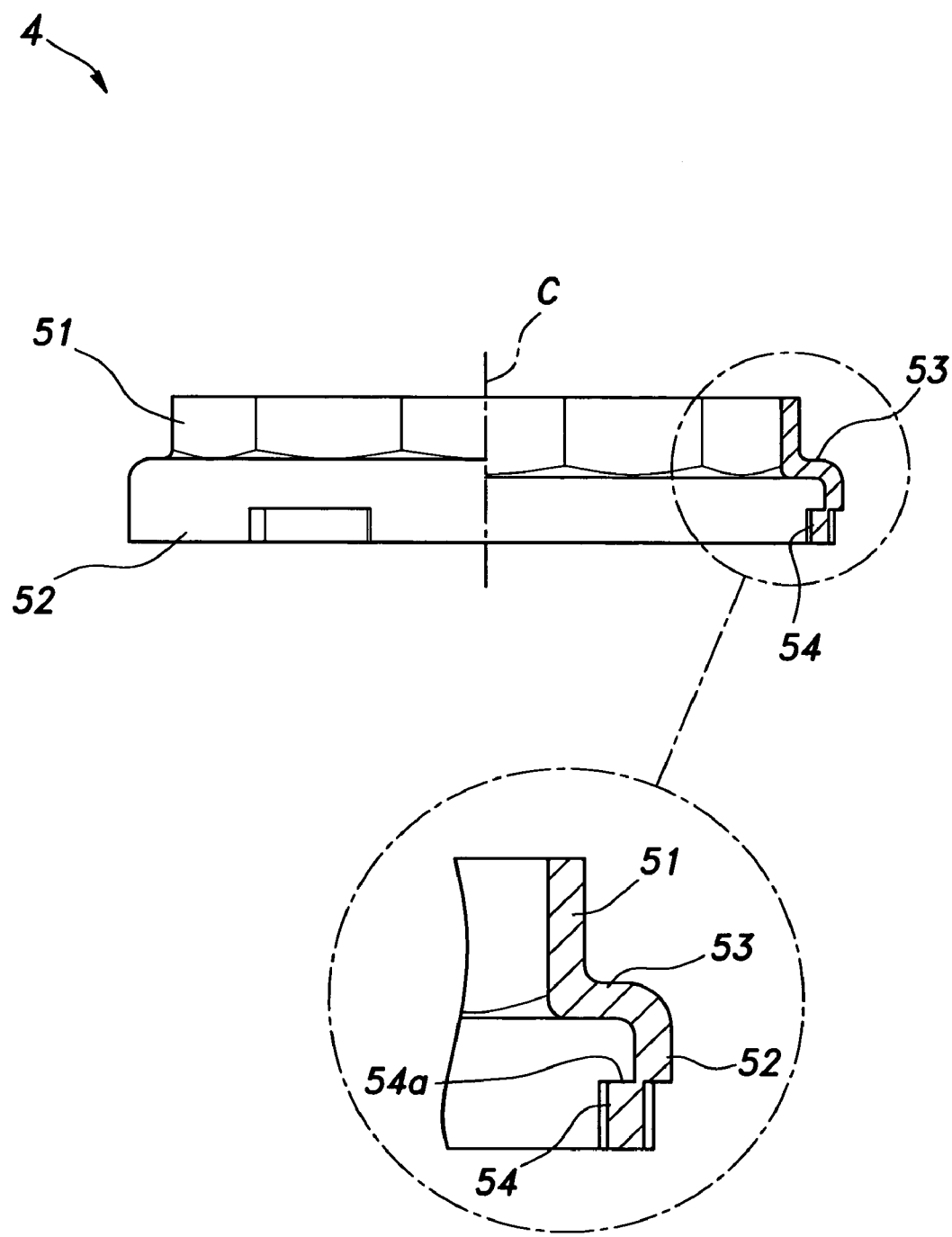
FIG. 11 is a sectional view taken along line XI-XI of FIG. 10.

FIG. 1 is a perspective view showing an oil filter embodying the present invention, FIG. 2 is a vertical sectional view of the oil filter of the first embodiment, and FIG. 3 is an exploded perspective view of the first embodiment. FIG. 4 is a plan view of the casing of the first embodiment, FIG. 5 is a sectional view taken along line V-V of FIG. 4, FIGS. 6a and 6b are enlarged end views seen in the directions indicated by arrows VIa and VIb in FIG. 4, respectively, FIG. 7 is a plan view of the set plate of the first embodiment, FIG. 8 is a sectional view taken along line VIII-VIII of FIG. 7, FIGS. 9a and 9b are enlarged end views seen in the directions indicated by arrows IXa and IXb, respectively, FIG. 10 is a plan view of the lock ring of the first embodiment, FIG. 11 is a sectional view taken along line XI-XI of FIG. 10, and FIGS. 12 to 18 are views for illustrating the mode of operation of the first embodiment.

Structure of the First Embodiment

<Overall Structure>

Referring to FIGS. 1 to 3, the oil filter 1 of the first embodiment essentially consists of a cylindrical cup-shaped casing 2, a set plate (lid) 3 consisting of a disk member closing the lower end (open end) of the casing 2 and an annular lock ring 4 that fastens the set plate 3 onto the casing 2. It should be noted that the closed end of the casing is referred to as an upper end, and the open end is referred to as a lower end throughout this disclosure although the orientation of the casing in actual use may deviate from such denomination.

Referring to FIG. 2, the casing 2 accommodates therein a per se known filter element 5 consisting of filtering paper folded into the shape of a chrysanthemum flower, a spring (sheet spring) 6 that resiliently urges the filter element 5 downward and a relief valve 7 for bypassing the engine oil when the filter element 5 is clogged up. The set plate 3 is fitted with a gasket 8 for providing a seal for a seat surface S formed in a crankcase or the like, a retaining ring 10 for securing the gasket 8 to the set plate 3, an O-ring 11 for providing a seal between the casing 2 and set plate 3, and a check valve 12 for preventing the engine oil draining back to the engine when the engine is stopped.

<Casing>

As shown in FIGS. 4 and 5, the casing 2 consists of a stamp formed steel plate (drawn into a cylindrical shape), and comprises a main body 22 having a tool engagement portion 21 at an upper end thereof that is given with a polygonal shape (having 14 sides in the illustrated embodiment) to permit a fastening tool to be engaged and a radial flange 23 formed at the open end of the main body 22. As shown in the enlarged fragmentary view of FIG. 5, the open end of the main body 22 is formed with a double walled portion 24 by folding back the material of the open end of the main body 22 closely (without any gap) onto the outer surface thereof. Referring to FIG. 2, the inner circumferential surface of the double walled portion 24 provides a seal surface 24a that engages the O-ring 11, and the radial outer flange 23 extends from the upper end of the outer wall of the double walled portion 24. In other words, the upper end of the seal surface 24 substantially aligns with the radial outer flange 23, and extends below the radial outer flange 23.

As shown in FIG. 4, the radial flange 23 is provided with three stop projections 25 for preventing the casing 2 from turning relative to the set plate 3, three notches 26 each for permitting the passage of corresponding engagement lug 54 (which are described hereinafter) of the lock ring 4 and three biasing projections 27 (biasing portions) serving as a biasing means projecting from the lower surface thereof, the members of each threesome being arranged at a regular angular interval of 120 degrees and each threesome being arranged at different angular phase positions from those of the other threesomes. Each stop projection 25 projects downward as illustrated in FIGS. 5 and 6a, and comprises a rectangular main wall 25a extending obliquely downward from the upper end of the double walled portion 24 and a pair of side walls 25b and 25c connecting the two sides of the main wall 25a to the radial outer flange 23. Each notch 26 adjoins the corresponding stop projection 25 so as to advance slightly clockwise therefrom as seen from above, and is dimensioned so as to permit the passage of the corresponding engagement lugs 54 (which is described hereinafter) on the side of the lock ring 4 when installing the oil filter 1. Each biasing projection 27 is provided with a semicircular shape as shown in FIG. 6b and projects downward from the radial flange 23 at an intermediate point between two adjacent stop projections 25 so that an adequate engaging force can be ensured between the engagement lugs 54 (engagement portions on the lock ring 4) and engagement rims 43 (engagement portion on the lid which are described hereinafter) can be ensured without unduly increasing the size of the biasing projections 27. The stop projections 25 and biasing projections 27 may be formed simultaneously as stamp forming the casing 2.

<Set Plate>

The set plate 3 consists of a forged steel product but may also consist of stamp formed sheet metal such as steel plate, and is centrally provided with a boss 31 that projects upward as shown in FIGS. 7 and 8. The boss 31 is provided with a female thread 32 in an inner circumferential surface thereof for threading engagement with a threaded boss B (See FIG. 2) formed on a crankcase or the like to define a passage (outflow passage) for conducting engine oil to the engine. Around the boss 31 are formed eight through holes 33 at a regular angular interval (of 45 degrees) which provide passages (inflow passages) for conducting engine oil from the engine to the filter element 5. The eight through holes 33 are surrounded by an O ring support wall 34 that projects upward for retaining the O-ring 11 between the O ring support wall 34 and double walled portion 24 of the casing 2. As shown in FIG. 8, the O ring support wall 34 is provided with a retaining projection 34a projecting outward from an upper end thereof for retaining the O ring 11 in place.

On the upper face of the set plate 3 is formed an annular recess 35 that surrounds the O-ring support wall 34 and adjoins the lower end of the double walled portion 24 of the casing 2. On the lower face of the set plate 3 is formed an annular projection 36 that controls the compression stroke (collapsing stroke) of the gasket 8 by engaging the seat surface (See FIG. 2) by a metal-to-metal contact when installing the oil filter 1. In the illustrated embodiment, the annular recess 35 and annular projection 36 are formed at mutually aligning positions so that the weight of the set plate 3 can be minimized without compromising the rigidity thereof. The provision of the annular recess 35 allows the casing 2 to be brought close to the set plate 3 so as to minimize the size of the oil filter 1 in the illustrated embodiment, but an even further reduction in the size of the oil filter 1 can be accomplished if the lower end of the double walled portion 24 of the casing 2 is allowed to be received in the annular recess 35.

An annular peripheral wall 37 extends upright from the part of the set plate 3 outside the annular recess 35 so as to surround the double walled portion 24 of the casing 2, and an engagement flange 38 extends radially outwardly from the upper end of the peripheral wall 37 so as to engage the lower surface of the radial outer flange 23 of the casing 2. As shown in FIG. 7, the peripheral part (the peripheral wall 37 and engagement flange 38) of the set plate 3 is provided with three stop recesses 41 (stop portions on the side of the lid), three notches 42 and three engagement rims 43 (engagement portions on the side of the lid), the members of each threesome being arranged at a regular angular interval of 120 degrees and each threesome being arranged at different angular phase positions from those of the other threesomes.

Each stop recess 41 is formed in the peripheral wall 37 and engagement flange 38 so as to define a rectangular wall as shown in FIGS. 7 and 8, and is configured to closely receive the corresponding stop projection 25 of the casing 2 as shown in FIG. 9a when installing the oil filter 1. The notches 42 are provided at positions of the set plate 3 corresponding to those of the notches 26 of the casing 2 and are each dimensioned so as to permit the passage of the corresponding engagement lug 54 of the lock ring 4 when installing the oil filter 1.

The upper surface of each engagement rim 43 is formed with a pressure surface 43a for engaging the lower surface of the radial outer flange 23 of the casing 2 as shown in FIG. 9b. The lower surface of each engagement rim 43 is formed with a retaining projection 43c, at a circumferential end thereof adjacent to the corresponding notch 42, serving as a rotation preventing means for preventing the movement of the engagement lug 54 toward the corresponding notch 42 once the engagement lug 54 is retained by the engagement rim 43. The circumferential end of each engagement rim 43 facing away from the retaining projection 43c of the retaining recess 43b is formed with an engagement wall 43d for preventing the angular movement of the engagement lug 54 beyond a prescribed limit. The corner of the retaining projection 43c adjacent to the notch 42 is formed with a beveled or chamfered surface 43e so that the engagement lug 54 may easily move over or ride over the retaining projection 43c.

In the illustrated embodiment, because each engagement rim 43 is formed on the side of the adjacent notch 42 opposite from the corresponding stop recess 41, the engagement lug 54 would not move into the stop recess 41. Thereby, the engagement rims 43 can engage the engagement lugs 54 with a relatively large margin of engagement, and the fastening of the lock ring 4 (casing 2) to the set plate 3 can be effected in a reliable manner. Each of the aforementioned biasing projections 27 of the casing 2 opposes the corresponding engagement lug 54 of the lock ring 4 via the corresponding engagement rim 43 in the assembled state of the oil filter 1. Each engagement wall 43d and corresponding part of the engagement flange 38 are joined to each other with a connecting flange 44 so as to ensure an adequate mechanical strength and rigidity (FIG. 9b).

<Lock Ring>

As shown in FIGS. 10 and 11, the lock ring 4 is made of a relatively thick stamp formed steel plate similarly, and is provided with an annular tool engagement portion 51 having a polygonal cross section (having 12 sides in the illustrated embodiment) so as to engage a fastening tool, an annular wall 52 having a larger diameter than the tool engagement portion 51 and surrounding the outer edges of the radial outer flange 23 and set plate 3 and a connecting portion (flange pressurizing portion) 53 that connects the tool engagement portion 51 with the annular wall 52. The lower surface of the connecting portion 53 engages the upper surface of the radial outer flange 23 of the casing 2 so as to downwardly pressurize the radial outer flange 23 in the assembled state of the oil filter 1.

A lower part of the annular wall 52 is provided with three inwardly projecting engagement lugs 54 that are arranged at a regular angular interval (120 degrees). Each engagement lug 54 is stamp formed so as to define an arcuate wall and have a same thickness as the remaining part of the annular wall 52 at each circumferential end thereof. The upper surface 54a of each engagement lug 54 defines a plane perpendicular to the axial line C of the casing (See FIG. 11). The upper end of each engagement lug 54 is barely connected to the annular wall 52 after the stamp forming in the illustrated embodiment, but may also be fully cut from the annular wall 52 after the stamp forming. Even in the latter case, because the two circumferential ends of each engagement lug 54 are connected to the remaining part of the annular wall 52, the engagement lug 54 is given with an adequate mechanical strength, and would not deform when subjected to any anticipated external force.

Mode of Operation of the First Embodiment

The mode of operation of the oil filter 1 of the first embodiment is described in the following by taking an example of the process of replacing the filter element 5.

When a vehicle (engine) has been used beyond a certain mileage or for more than a prescribed period of time, a car mechanic replaces the oil filter 1 with a new one so that the engine oil in the lubrication system continues to be properly filtered. In the case of the illustrated embodiment, the used oil filter 1 is returned to the car maker or car dealer, and the filter element 5 therein is replaced with a new one by a worker of a recycle plant or car service shop.

Figure 12:
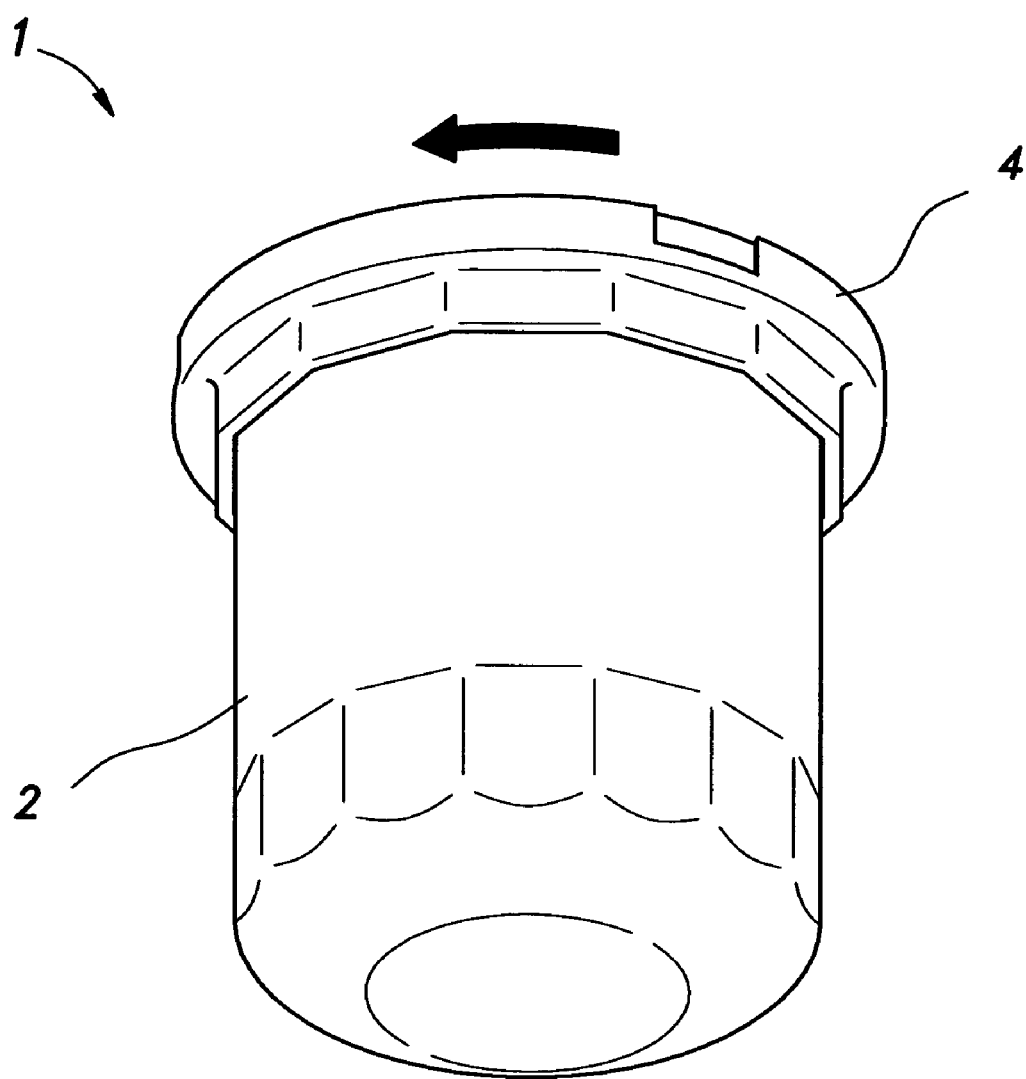
FIG. 12 is an inverted perspective view showing the mode of operation of the first embodiment.
Figure 13:
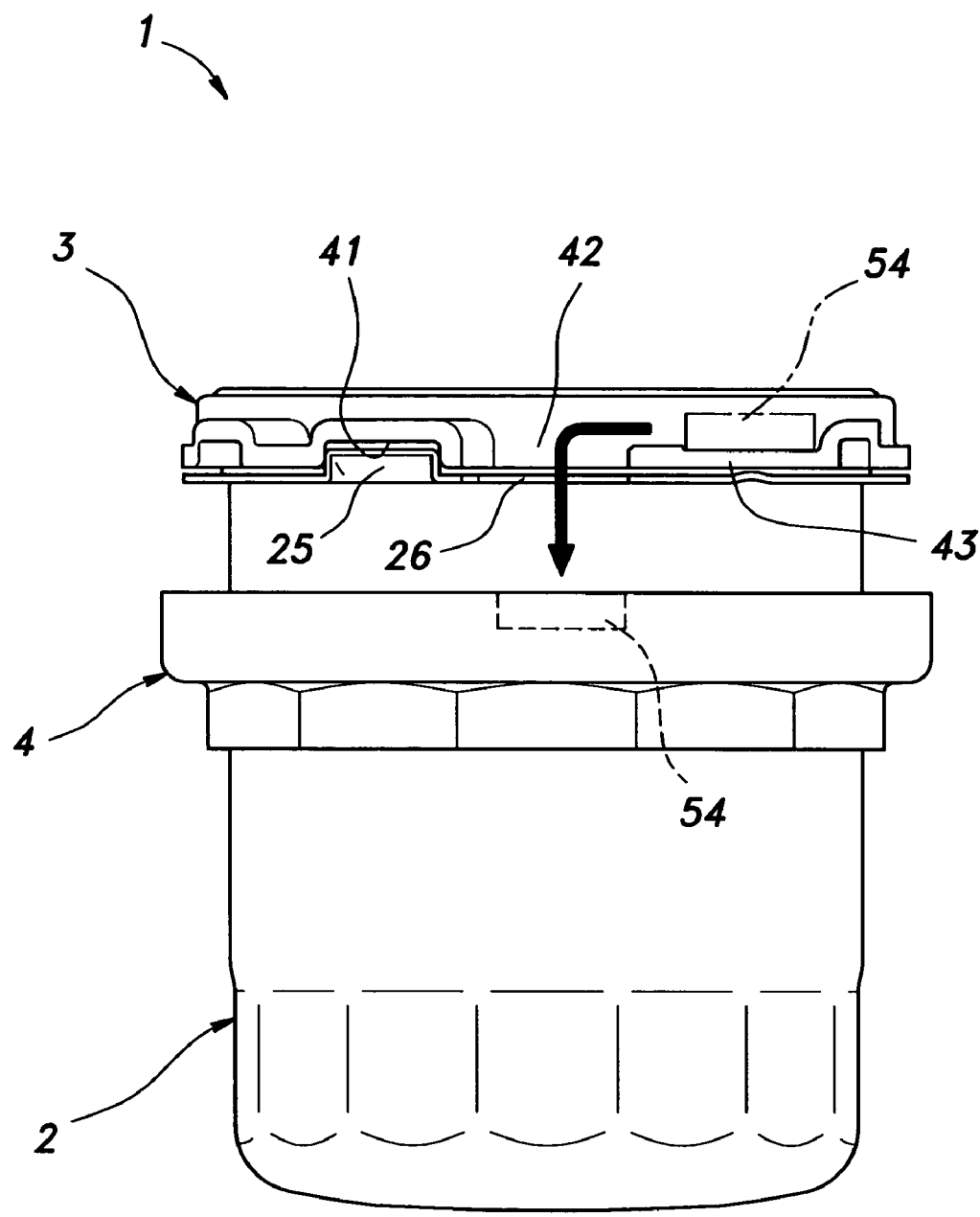
FIG. 13 is an inverted side view showing the mode of operation of the first embodiment.

When replacing the filter element 5, as shown in FIG. 12, the worker turns the lock ring 4 in the direction indicated by an arrow with respect to the casing 2 by using a hand or ring spanner with the oil filter 1 in an inverted orientation so as to prevent the spilling of the engine oil. This causes the engagement lugs 54 of the lock ring 4 to move from the engagement rims 43 to the notches 42 and 26 of the set plate 3 and casing 2, and the lock ring 4 to be removed downward as shown in FIG. 13.

The worker then separates the casing 2 from the set plate 3 to drain off the engine oil remaining in the casing 2 and remove the filter element 5, gasket 8 and O ring 11 from the casing 2 for disposal. Thereafter, the worker cleanses the casing 2, set plate 3 and relief valve 7, and install a new gasket 8, O ring 11 and check valve 12 on the set plate 3.

Figure 14:
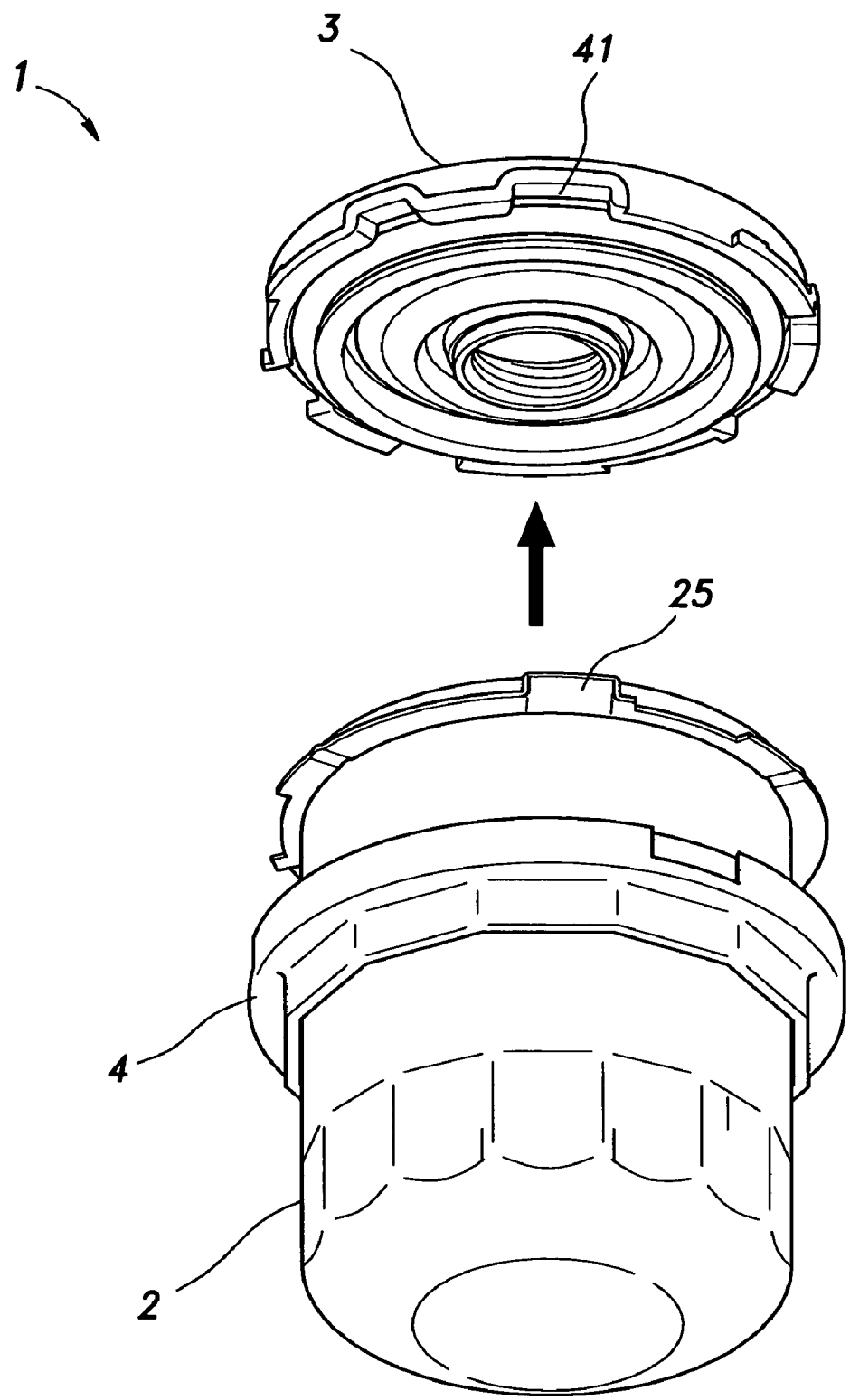
FIG. 14 is an inverted exploded perspective view showing the mode of operation of the first embodiment.

Thereafter, a spring 6 and relief valve 7 are assembled to an upper part of a new filter element 5, and the filter element 5 is placed inside the casing 2. Then, the casing 2 and set plate 3 are joined to each other by slipping the stop projections 25 into the corresponding stop recesses 41 (and pushing the double walled portion 24 of the casing 2 into the annular recess 35 of the set plate 3) as illustrated in FIG. 14

Figure 15A:
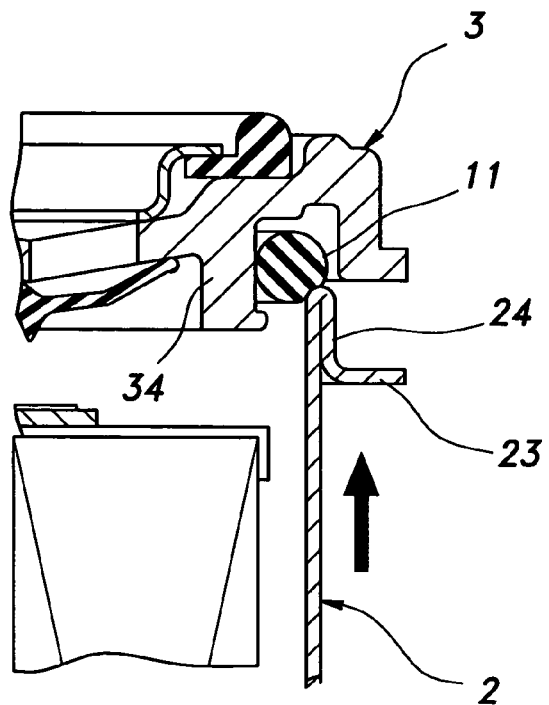
FIGS. 15a and 15b are fragmentary vertical sectional views showing the mode of operation of the first embodiment.
Figure 15B:
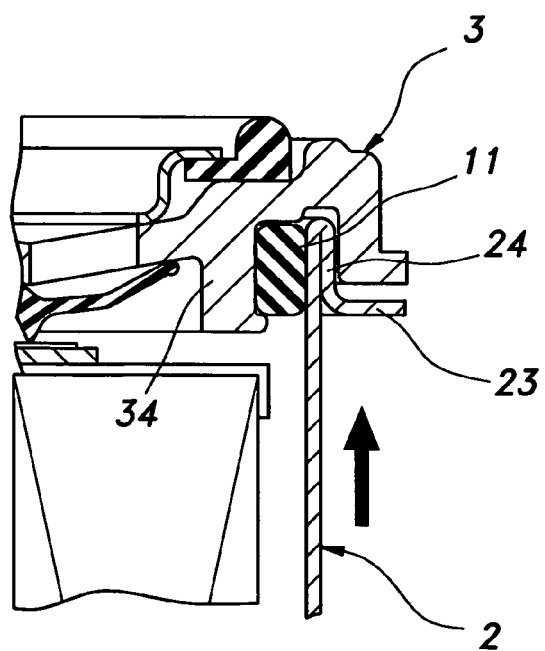

When joining the casing 2 to the set plate 3, the double walled portion 24 of the casing 2 is pushed toward the set plate 3 while resiliently deforming the outer periphery of the O ring 11 as illustrated in FIGS. 15a and 15b. At that time, because the lower end of the double walled portion 24 is provided with a U-shaped cross section (and does not have a sharp edge), the O ring 11 would not be damaged. Because the casing 2 is provided with the double walled portion 24 at an axially same position as the seal surface 24a, the seal surface 24 is protected from deformation (the circularity of the seal surface 24 can be ensured) even when the casing 2 is inadvertently dropped onto the floor during the assembly work.

Figure 16:
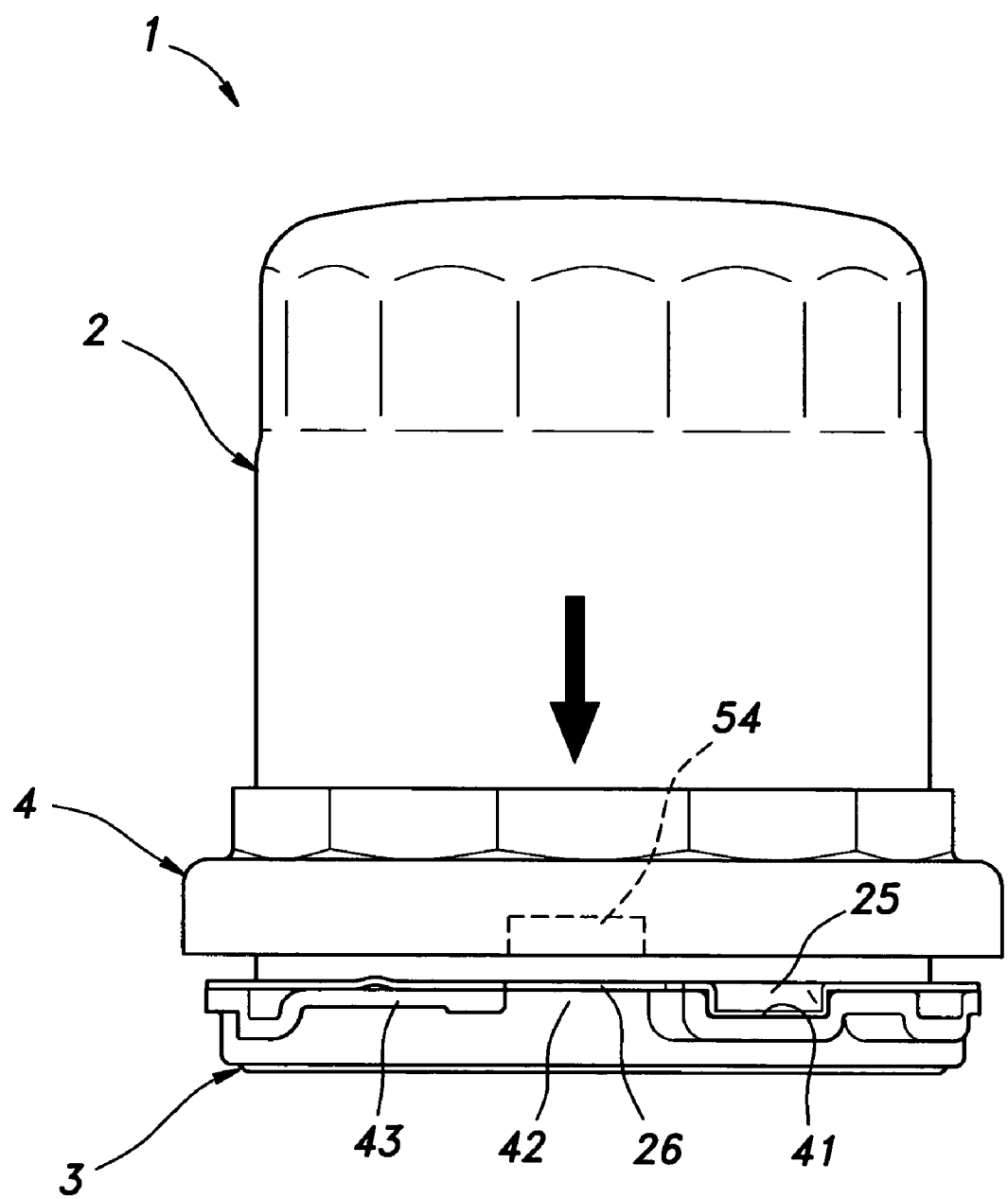
FIG. 16 is a side view showing the mode of operation of the first embodiment.
Figure 17:
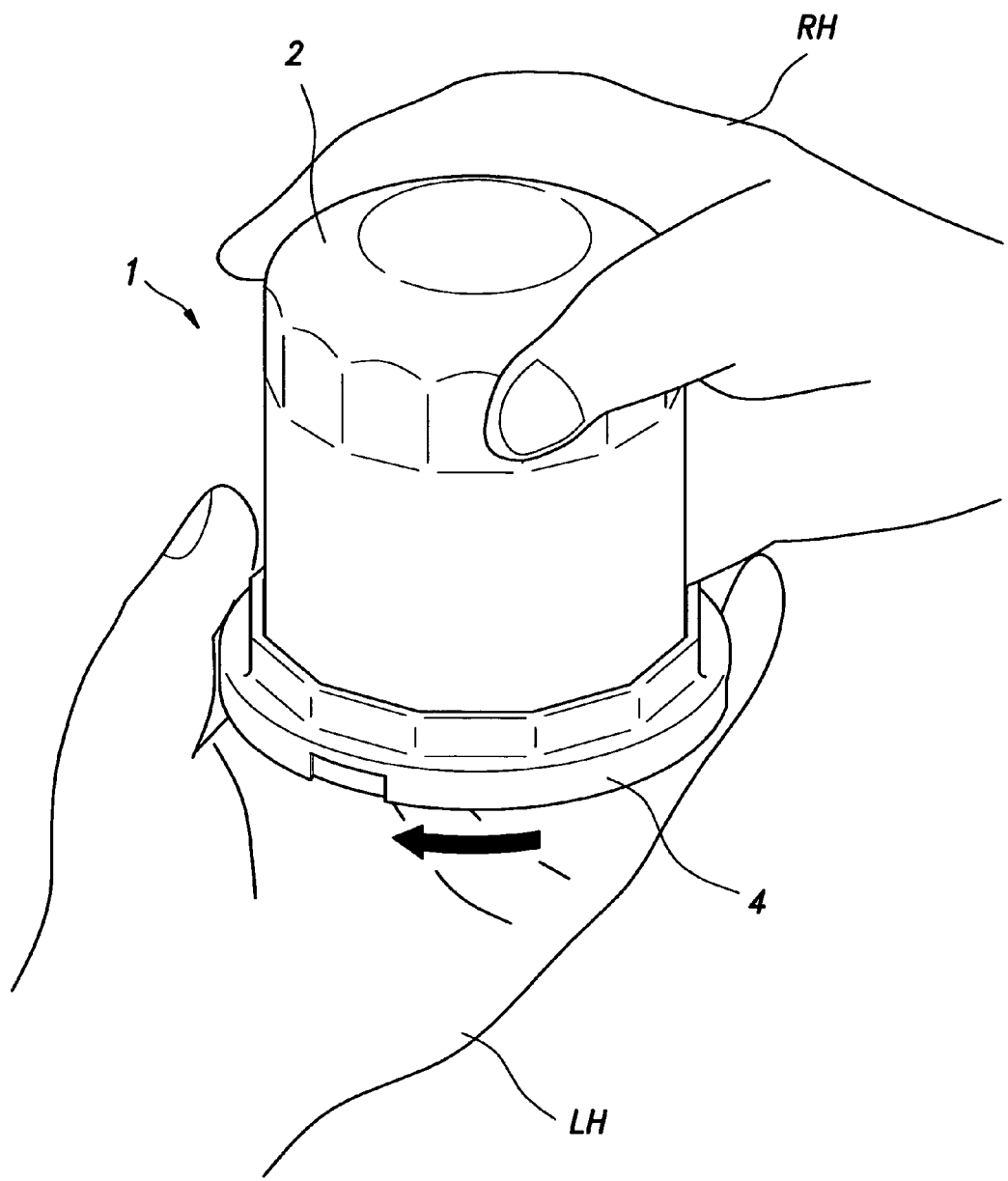
FIG. 17 is a perspective view showing the mode of operation of the first embodiment.
Figure 18A:
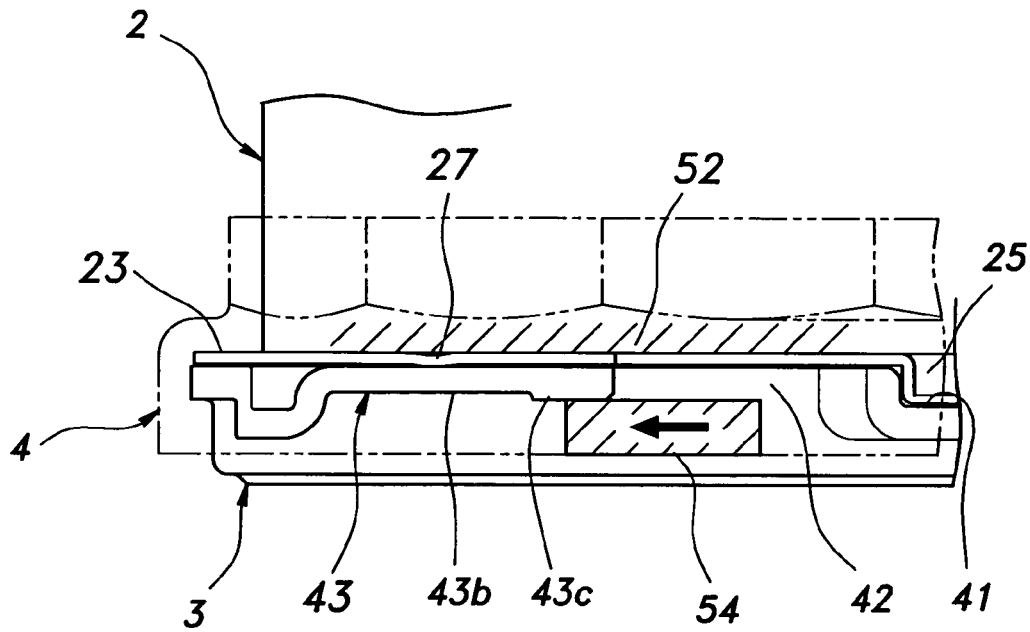
FIGS. 18a and 18b are fragmentary side views showing the mode of operation of the first embodiment.
Figure 18B:
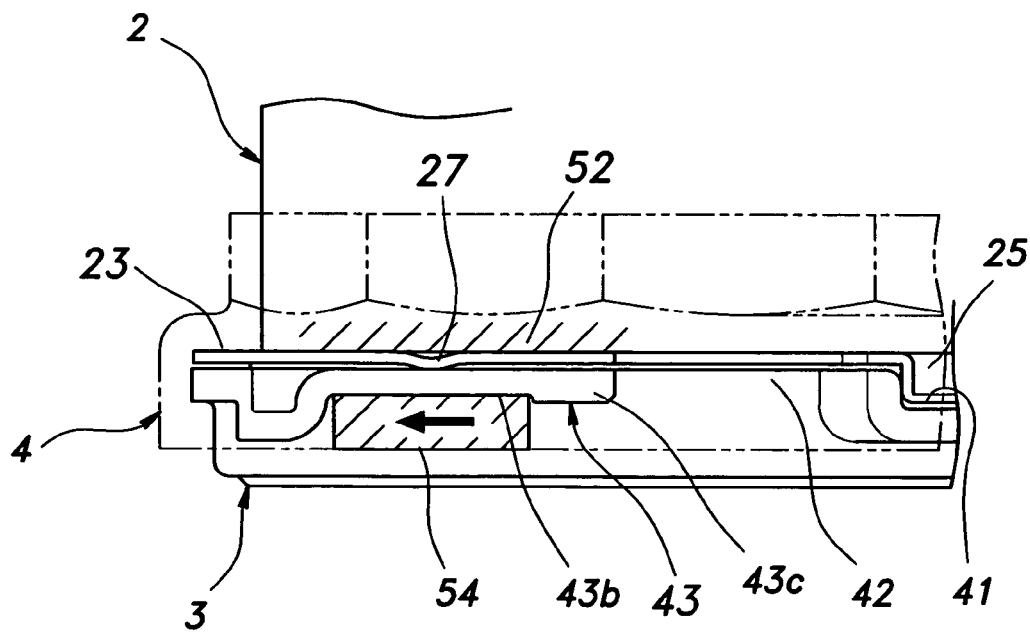

After joining the casing 2 with the set plate 3, the worker pushes the lock ring 4 downward with the engagement lugs 54 aligned with the notches 26 and 42 of the casing 2 and set plate 3 as illustrated in FIG. 16. Thereafter, the worker turns the lock ring 4 with his left hand LH in the direction indicated by an arrow in FIG. 17 (away from the stop projections 25) by a certain angle (35 degrees in the illustrated embodiment) with the casing 2 held with his right hand RH. As a result, each engagement lug 54 of the lock ring 4 moves out of the corresponding notch 42 of the set plate 3 and rides over the stop projection 43c of the corresponding engagement rim 43 as illustrated in FIG. 18a until each engagement lug 54 slips into the corresponding retaining recess 43b as illustrated in FIG. 18b. Thereby, the radial outer flange 23 and engagement rims 43 are interposed between the connecting portion 53 of the lock ring 4 and engagement lugs 54, and the casing 2 is securely fastened to the set plate 3.

In the case of the illustrated embodiment, when rotating the lock ring 4 with respect to the casing 2, a side force acts upon each stop projection 25 of the casing 2 via the corresponding stop recess 41 of the set plate 3. Because the stop projection 25 is formed by connecting the main wall 25a to the radial outer flange 23 with the side walls 25b and 25c, even though the casing 2 is made of thin steel plate, the stop projection 25 is given with a high rigidity and would not be easily deformed even when an excessive force is applied thereto by the worker. For the same reason, each stop projection 25 would not be easily deformed even when the oil filter 1 is inadvertently dropped when installing the oil filter 1 to the engine or when assembling the casing 2.

As each engagement lug 54 rides over the corresponding retaining projection 43c, because the gap between the connecting portion 53 of the lock ring 4 and the engagement rims 43 is temporarily reduced, the biasing projections 27 formed on the radial outer flange 23 of the casing 2 firmly urges the retaining projections 43c (set plate 3) against the engagement lugs 54 (lock ring 4) by undergoing an elastic deformation. The deformation of the biasing projections 27 diminishes as the engagement lugs 54 slip into the corresponding retaining recesses 43b, but the biasing projections 27 continue to urge the engagement rims 43 against the engagement lugs 54 so that the lock ring 4 is prevented from loosening or rattling and the engagement lugs 54 are prevented from riding back over the retaining projection 43 serving as a rotation preventing means toward the corresponding notches 42. The projecting height of the biasing projections 27 from the radial outer flange 23 (or the pressure they produce) should be determined also by taking into account the convenience of the assembling process.

Effect of the First Embodiment

Because the oil filter 1 of the first embodiment allows the casing 2 to be separated from the set plate 3 by turning the lock ring 4 relative to the casing 2 by a relatively small angle, the efficiency in disassembling and assembling of the oil filter 1 when replacing the filter element 5 and discarding the oil filter can be substantially improved. Because the casing 2 and lock ring 4 are made of stamp formed steel plate, the manufacturing cost and weight of the oil filter 1 can be reduced. Because the oil filter 1 is configured such that the lower end of the double walled portion 24 of the casing 2 advances into the annular recess 35, the thickness of the set plate 3 can be minimized, and this enables a compact and light weight design of the oil filter. Because the annular recess 35 and annular projection 36 are formed on the upper and lower surfaces of the set plate 3, respectively, at a substantially same radial position, the provision of the annular recess 35 would not diminish the rigidity of the set plate 3.

Because the peripheral wall 37 and the radial outer flange 23 of the casing 2 are located outside the double walled portion 24 (seal surface 24a), the surrounded part of the casing 2 is given with an increased mechanical strength and rigidity even though the casing 2 is made of thin steel plate. Therefore, in the assembled state of the oil filter 1, the deformation of the seal surface 24a of the casing 2 is minimized at the point where the maximum seal pressure is applied during the operation of the engine and a high sealing performance can be ensured at all times. Also, even when the oil filter 1 is inadvertently dropped during the assembly work, the double walled portion 24 would not readily deform (and the circularity of the seal surface 24a can be maintained).

As for the set plate 3, because the retaining projection 34a is formed at the upper end of the O ring support wall 34, the O ring 11 is prevented from coming off when assembling the oil filter 1 and is prevented from dislodging when subjected to the vibrations of the engine. Because the peripheral wall 37 of the set plate 3 closely surrounds the double walled portion 24 of the casing 2, even when the seal pressure causes the double walled portion 24 to open out or when the double walled portion 24 is deformed for any reason (or when the circularity of the seal surface is impaired), the peripheral wall 37 prevents or corrects the deformation of the double walled portion 24, as the case may be, and maintains a sealing performance.

Second Embodiment

Figure 19:
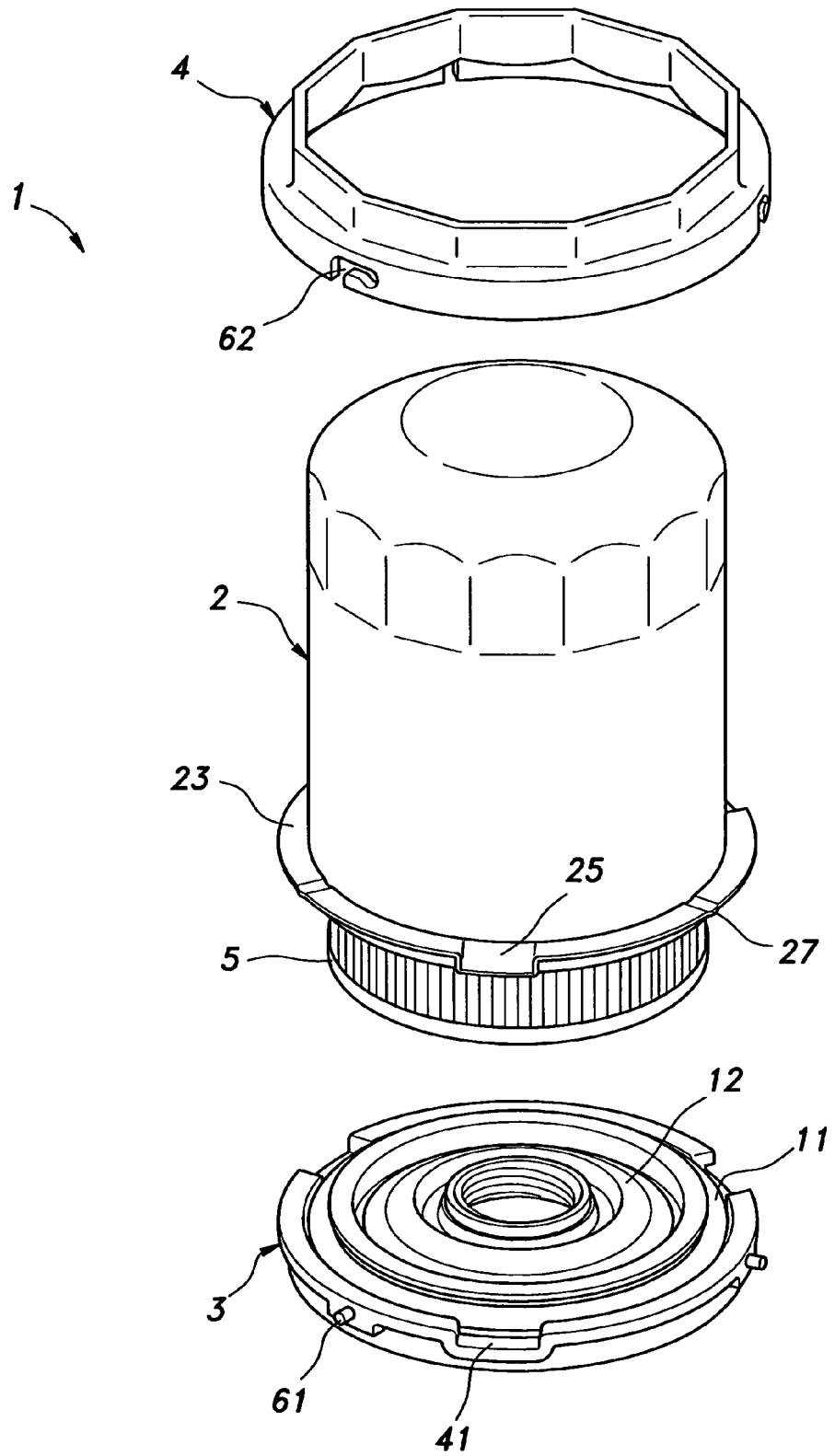
FIG. 19 is an exploded perspective view of the oil filter of the second embodiment.
Figure 20:
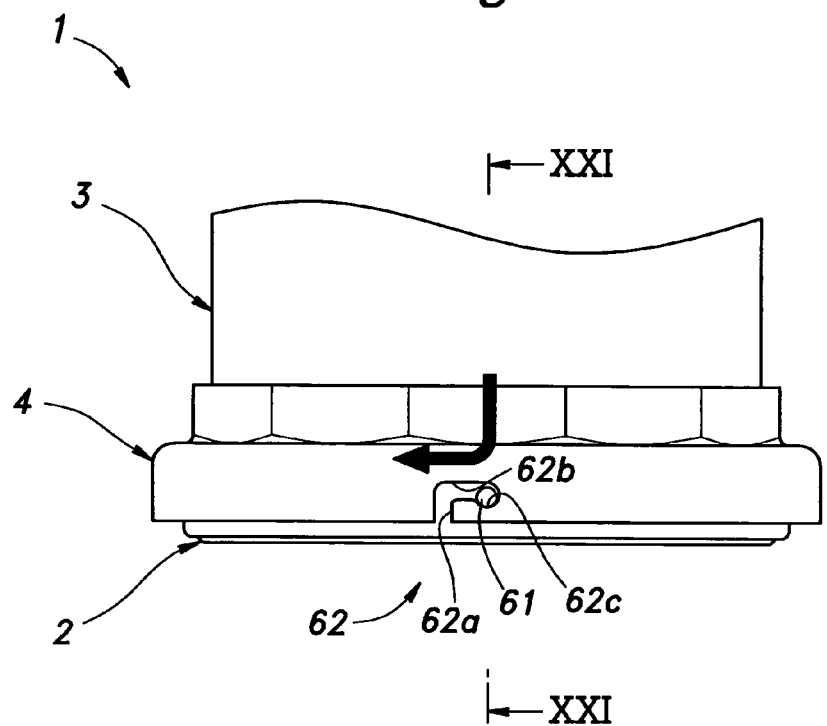
FIG. 20 is a fragmentary side view of the oil filter of the second embodiment.
Figure 21:
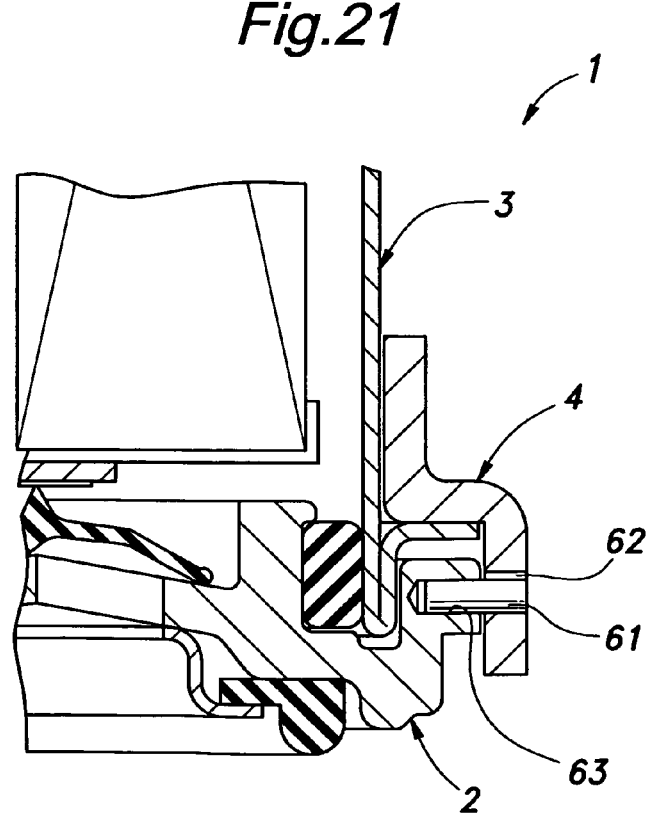
FIG. 21 is an enlarged fragmentary sectional view taken along line XXI-XXI of FIG. 20.

FIG. 19 is an exploded perspective view of the oil filter of the second embodiment, FIG. 20 is a fragmentary side view of the oil filter of the second embodiment, and FIG. 21 is an enlarged sectional view taken along line XXI-XXI of FIG. 20.

As shown in FIGS. 19 to 21, the overall structure of the oil filter 1 of the second embodiment is similar to that of the first embodiment, but differs in the way the set plate 3 is fastened to the lock ring 4. More specifically, in the second embodiment, three projections or lateral pins 61 are press fitted into the outer periphery of the set plate 3 at a regular angular interval (120 degrees) so that they may fit into corresponding three engagement slots 62 formed in the lock ring 4, and the set plate 3 may be fastened to the lock ring 4 (or the casing 2).

In this embodiment, holes 63 for press fitting the pins 61 are drilled or otherwise formed in the peripheral wall 37 of the set plate 3 as shown in FIG. 21. Each engagement slot 62 is substantially shaped as an inverted letter L as seen from a side, and comprises an axial section 62a extending axially from a lower edge of the peripheral wall 37, a lateral section 62b extending laterally from an upper end of the axial section 62a and a retaining recess 62c formed in a lower edge of an end of the lateral section 62b remote from the axial section 62a. Therefore, the pin 61 can be engaged by the engagement slot 62 by pushing the lock ring 4 toward the set plate 3 and turning the lock ring 4 relative to the set plate 3 as indicated by an arrow in FIG. 20. The retaining recess 62c prevents the dislodging of the pin 61.

The operation and effect of the second embodiment are similar to those of the first embodiment, but the second embodiment has the advantage of simplifying the fabrication of the die mold for the set plate 3 even though the component parts and work steps must be added for the provision of the pins 61.

Third Embodiment

Figure 22:
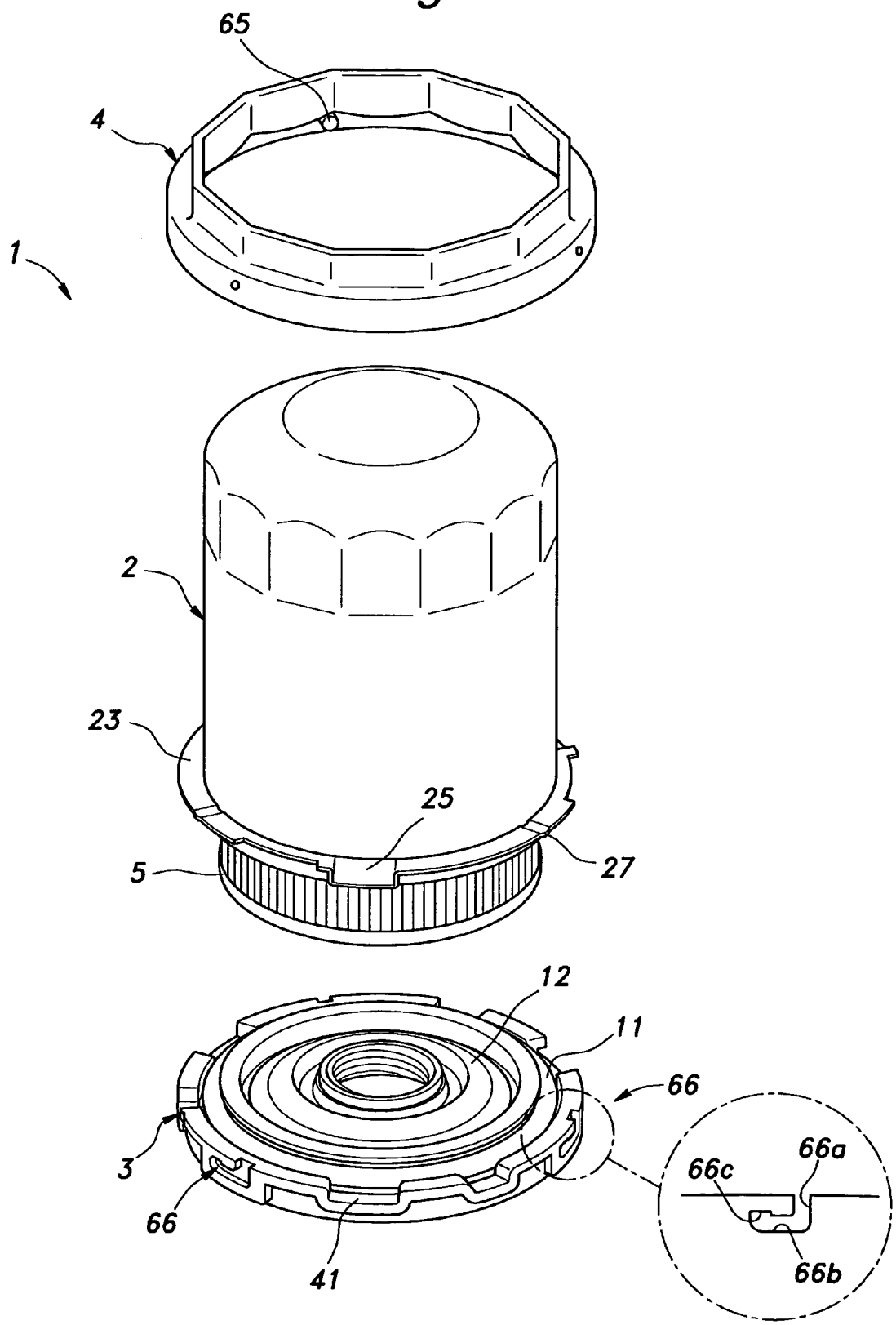
FIG. 22 is an exploded perspective view of the oil filter of the third embodiment.
Figure 23:
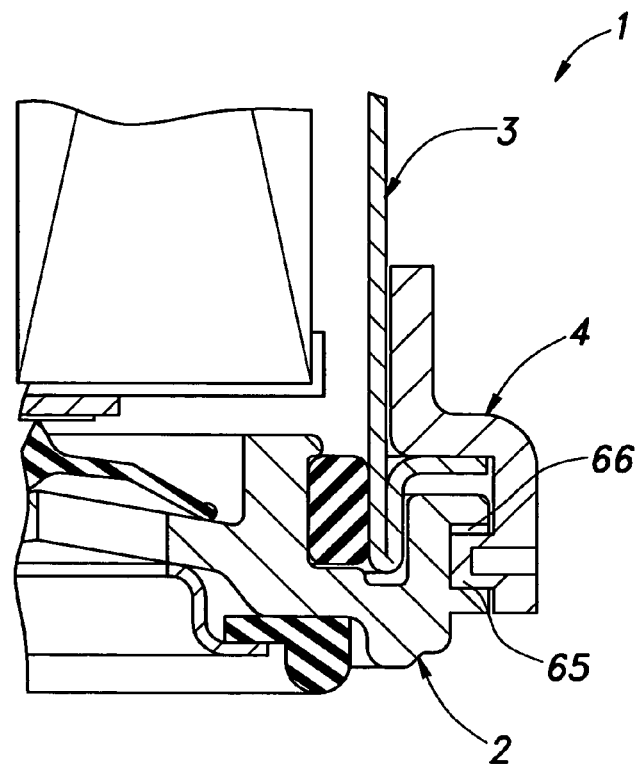
FIG. 23 is a fragmentary side view of the oil filter of the third embodiment.

FIG. 22 is an exploded perspective view of the oil filter of the third embodiment, and FIG. 23 is a fragmentary vertical sectional view of the oil filter of the third embodiment.

As shown in FIGS. 22 and 23, the overall structure of the oil filter 1 of the third embodiment is similar to those of the first and second embodiments, but differs in the way the set plate 3 is fastened to the lock ring 4. More specifically, in the third embodiment, the inner peripheral surface of the lock ring 4 is provided with three cylindrical projections 65 at a regular angular interval (120 degrees), and the set plate 3 can be fastened to the lock ring 4 (or the casing 2) by engaging these cylindrical projections 65 with three corresponding engagement grooves (or slots) 66 formed in the outer periphery of the set plate 3.

In this embodiment, the cylindrical projections 65 are formed by embossing during the stamp forming of the lock ring 4. The three engagement grooves 66 are formed on the outer surface of the peripheral wall of the set plate 3. Each engagement groove 66 is substantially shaped as an inverted letter L as seen from a side, and comprises an axial section 66a extending axially from an upper end of the peripheral wall of the set plate 3, a lateral section 66b extending laterally from an upper end of the axial section 66a and a retaining recess 66c formed in an upper edge of an end of the lateral section 66b remote from the axial section 66a. Therefore, the cylindrical projections 65 can be engaged by the engagement grooves 66 by pushing the lock ring 4 toward the set plate 3 and turning the lock ring 4 relative to the set plate 3. The retaining recess 66c prevents the dislodging of the pin 61.

Modified Embodiments

Modifications of the foregoing embodiments are now described in the following with reference to FIGS. 24 to 27.

Modified Embodiments of the Rotation Preventing Means

FIGS. 24 to 27 are fragmentary side views showing various modified embodiments of the rotation preventing means of the first embodiment.

Figure 24:
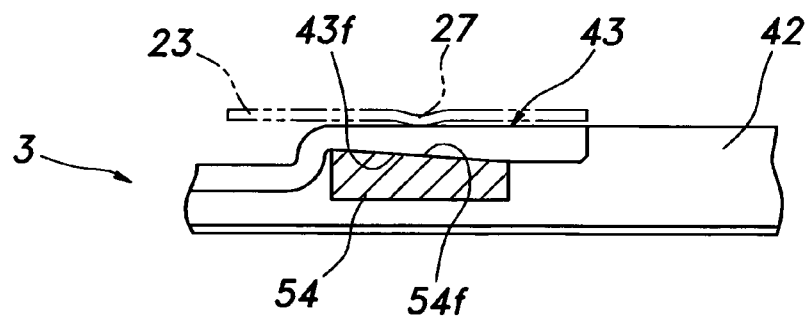
FIG. 24 is a fragmentary side view of a modified embodiment of the rotation preventing means of the first embodiment.

In the modified embodiment illustrated in FIG. 24, the rotation preventing means comprises slanted surfaces 43f and 54f provided on the lower surfaces of the engagement rims 43 and the upper surfaces of the engagement lugs 54 so as to incline upward from the notches 42 to the connecting flanges 44. Thereby, in the illustrated modified embodiment, each engagement lug 54 is subjected to a force (a component of the axial force produced by the biasing projections 27) that urges the engagement lug 54 toward the corresponding connecting flange 44, and, once engaged by the corresponding engagement rim 43, the engagement lug 54 (or the lock ring 4) is thereby prevented from moving (turning) toward the corresponding notch 42.

Figure 25:
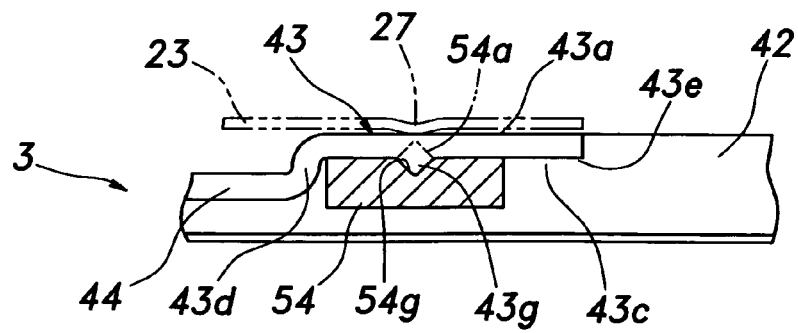
FIG. 25 is a fragmentary side view of a modified embodiment of the rotation preventing means of the first embodiment.

In the modified embodiment illustrated in FIG. 25, the rotation preventing means comprises projections 43g formed on the lower surface of each engagement rim 43 at a position immediately under the corresponding biasing projection 27 and a recess 54g formed in each engagement lug 54 for receiving the corresponding projection 43g. Thereby, in this modified embodiment, a reliable engagement is ensured between the engagement rims 43 and engagement lugs 54, and the engagement lugs 54 (or the lock ring 4) engaged by the engagement rims 43 are prevented from moving (turning) toward the corresponding notches 42. Such engagement projections may also be formed on each engagement lug 54 as indicated by an imaginary line 54a in FIG. 25.

Figure 26:
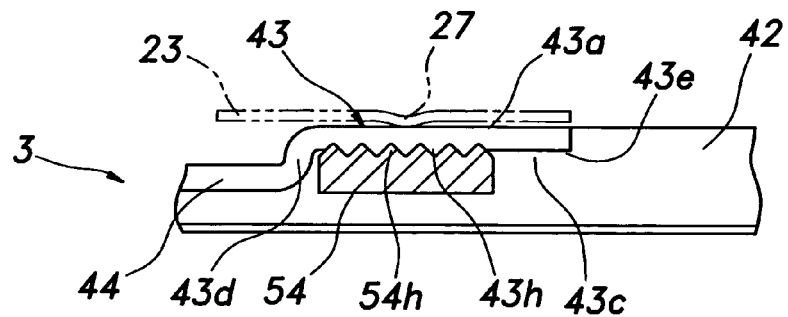
FIG. 26 is a fragmentary side view of a modified embodiment of the rotation preventing means of the first embodiment.

In the modified embodiment illustrated in FIG. 26, the rotation preventing means comprises a plurality of saw teeth 43h formed on the lower surface of each engagement rim 43 and matching saw teeth 54h formed on each engagement lug 54. Thereby, in this modified embodiment, a reliable engagement is ensured between the engagement rims 43 and engagement lugs 54, and the engagement lugs 54 (or the lock ring 4) engaged by the engagement rim 43 are prevented from moving (turning) toward the corresponding notches 42.

Figure 27:
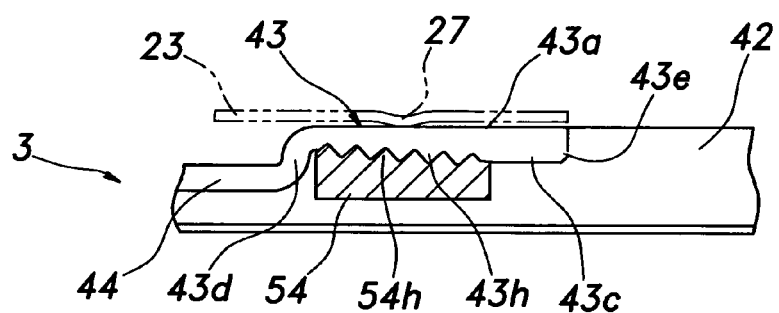
FIG. 27 is a fragmentary side view of another modified embodiment of the rotation preventing means of the first embodiment.

In the modified embodiment illustrated in FIG. 27, the rotation preventing means comprises a plurality of saw teeth 43h formed on the lower surface of each engagement rim 43 so as to incline upward from the adjacent notch 42 to the corresponding connecting flange 44, and matching saw teeth 54h formed on each engagement lug 54. Thereby, in this modified embodiment, a reliable engagement is ensured between the engagement rims 43 and engagement lugs 54 owing to a force that urges the engagement lugs 54 toward the connecting flanges 44 (a component of the axial force produced by the biasing projections 27), and the engagement lugs 54 (or the lock ring 4) engaged by the engagement rims 43 are prevented from moving (turning) toward the corresponding notches 42.

Modified Embodiments of the Stop Projections

Figure 28:
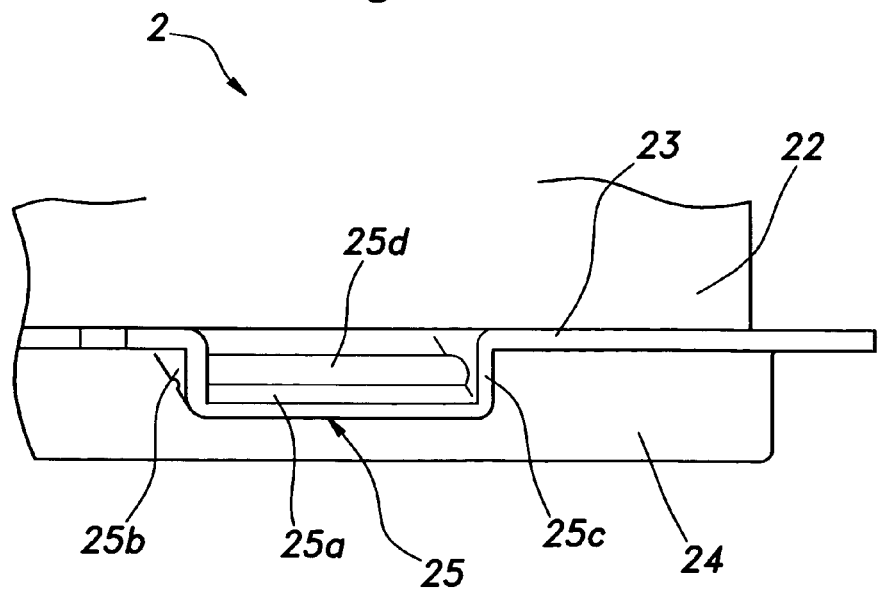
FIG. 28 is a fragmentary perspective view of a modified embodiment of the stop projection of the first embodiment.
Figure 29:
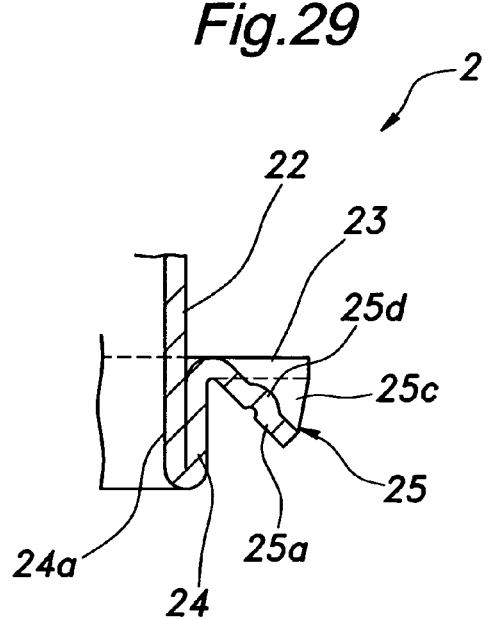
FIG. 29 is a fragmentary vertical sectional view of the modified embodiment of the stop projection of the first embodiment.

FIG. 28 is a fragmentary perspective view of a modified embodiment of the stop projections of the first embodiment, and FIG. 29 is a fragmentary vertical sectional view of the same. As can be appreciated from these drawings, a vertically middle part of the main wall 25*a* of each stop projection 25 is provided with a bead 25*d* that projects outward and extends laterally so as to connect the two side walls 25*b* and 25*c* to each other for the purpose of reinforcement. Thereby, in the illustrated modified embodiment, the rigidity of the main wall 25*a* is further increased without increasing the weight thereof, and the stop projection 25 would not easily deform even when an excessive force is applied thereto by a worker. Because the bead 25 projects outward (or bulges out), the rigidity of the stop projection 25 can be favorably increased.

Modified Embodiments of the Engagement Rim

Figure 30:
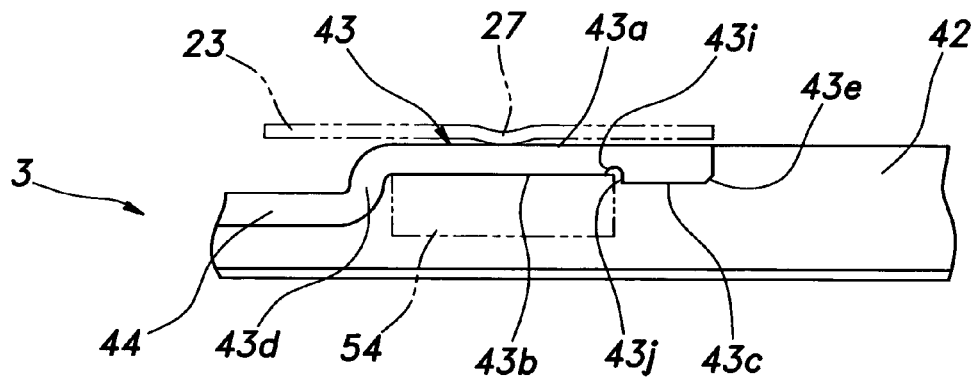
FIG. 30 is a fragmentary side view of a modified embodiment of the engagement rim of the first embodiment.

FIG. 30 is a fragmentary side view of a modified embodiment of the engagement rim of the first embodiment. As shown in the drawing, each engagement rim 43 of this modified embodiment is provided with a retaining recess 43*b* including a cutout 43*i* so that an end surface 43*j* of the retaining projection 43*c* facing the retaining recess 43*b* defines a plane extending in parallel with the axial center line of the oil filter 1. Thereby, in this modified embodiment, when slipping the engagement lugs 54 from the retaining projections 43*c* to the retaining recesses 43*b*, the worker can feel or hear a (tactile or audible) detent action, and this enables the worker to easily confirm the completion of the fastening process and thereby improves the work efficiency.

Modified Embodiments of the Rotation Preventing Engagement

Figure 31:
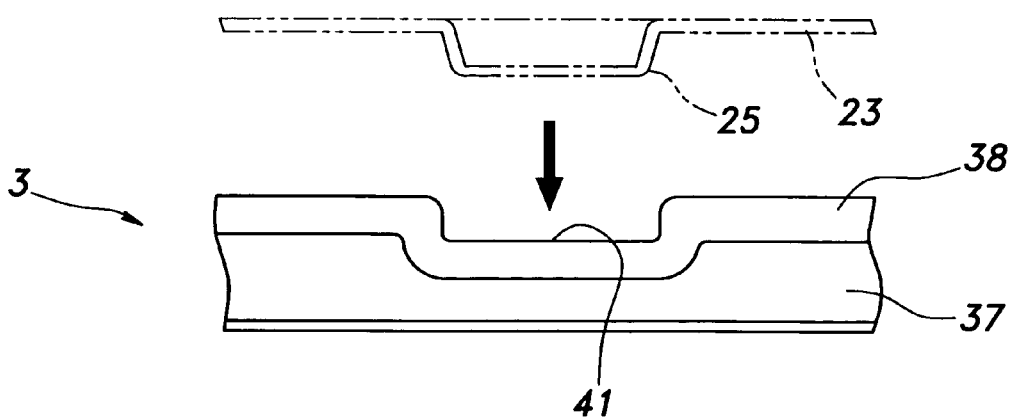
FIG. 31 is a fragmentary side view of a modified embodiment of the rotation preventing engagement of the first embodiment.
Figure 32:
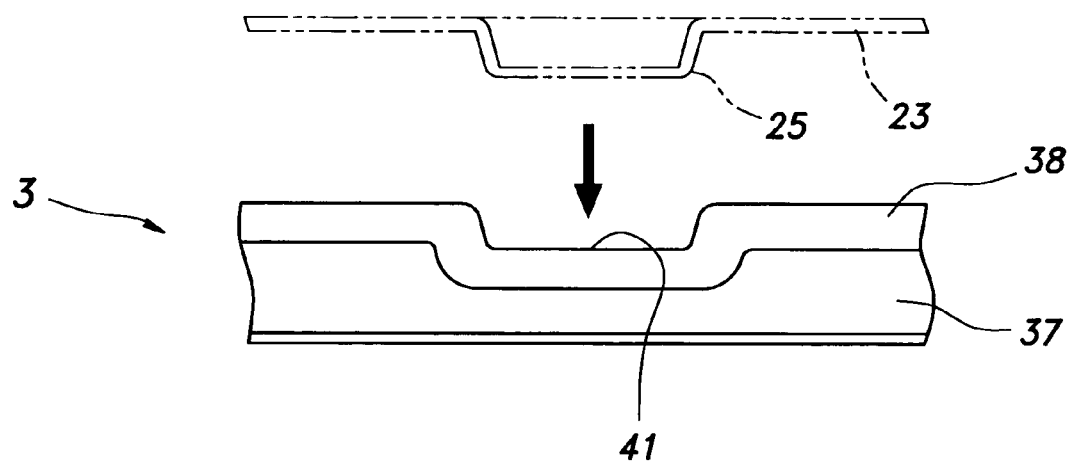
FIG. 32 is a fragmentary side view of another modified embodiment of the rotation preventing engagement of the first embodiment.

FIGS. 31 and 32 are fragmentary side views of modified embodiments of the rotation preventing engagement of the first embodiment.

The modified embodiment illustrated in FIG. 31 is provided with stop recesses 41 that are similar in shape to those of the first embodiment, but each stop projection 25 of this modified embodiment is provided with a trapezoidal shape having a progressively narrower width toward the bottom end thereof. Thereby, when assembling the casing 2 and set plate 3 to each other, each stop projection 25 can easily slip into the corresponding stop recess 41, and this improves the efficiency of the assembly work.

In the modified embodiment illustrated in FIG. 32, each stop recess 41 as well as each stop projection 25 is provided with a trapezoidal shape having a progressively narrower width toward the bottom thereof. Thereby, when assembling the casing 2 and set plate 3 to each other, each stop projection 25 can easily slip into the corresponding stop recess 41, and this improves the efficiency of the assembly work. Also, because the contact surface area between each stop projection 25 and the corresponding stop recess 41 increases, even when the worker applies an excessive force to the stop projections 25, the deformation of the stop projections 25 is minimized, and the capability of the stop projections 25 to prevent rotation is improved.

Modified Embodiments of the Casing

Figure 33:
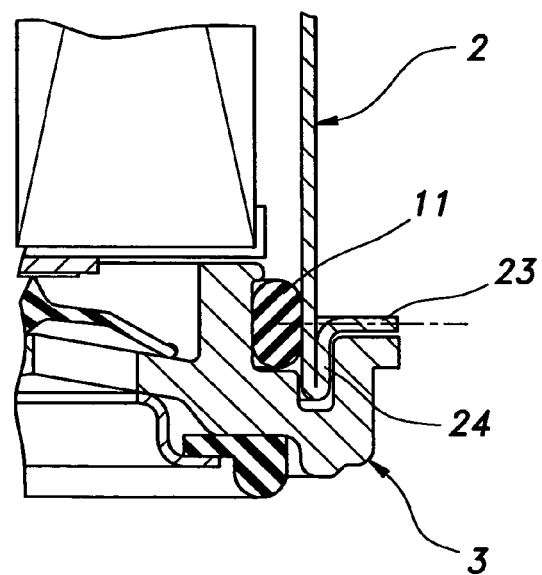
FIG. 33 is a fragmentary vertical sectional view of a modified embodiment of the casing of the first embodiment.
Figure 34:
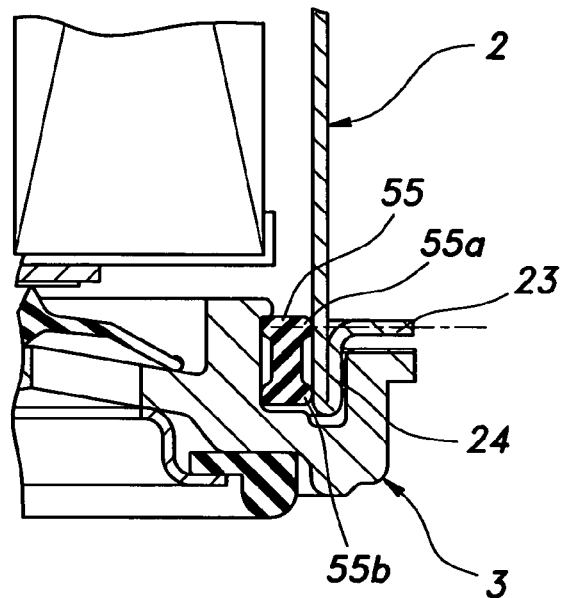
FIG. 34 is a fragmentary vertical sectional view of a modified embodiment of the casing of the first embodiment.
Figure 35:
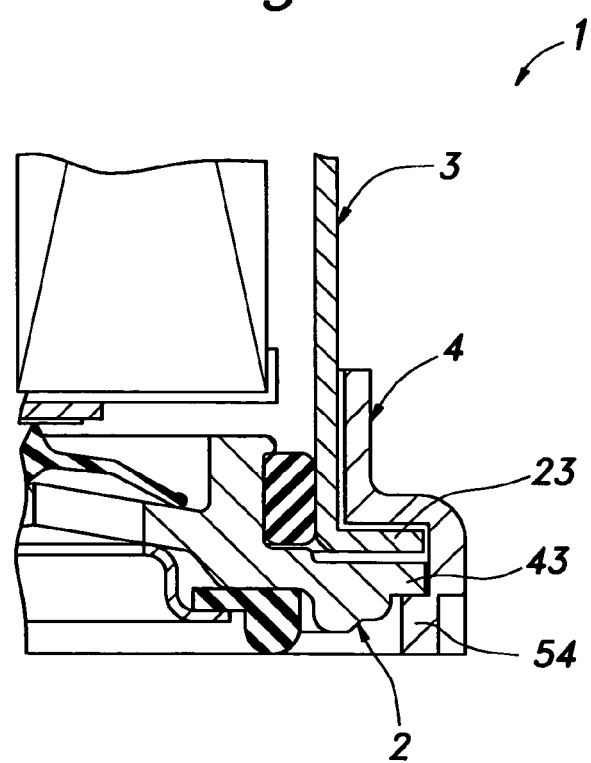
FIG. 35 is a fragmentary vertical sectional view of a modified embodiment of the casing of the first embodiment.
Figure 36:
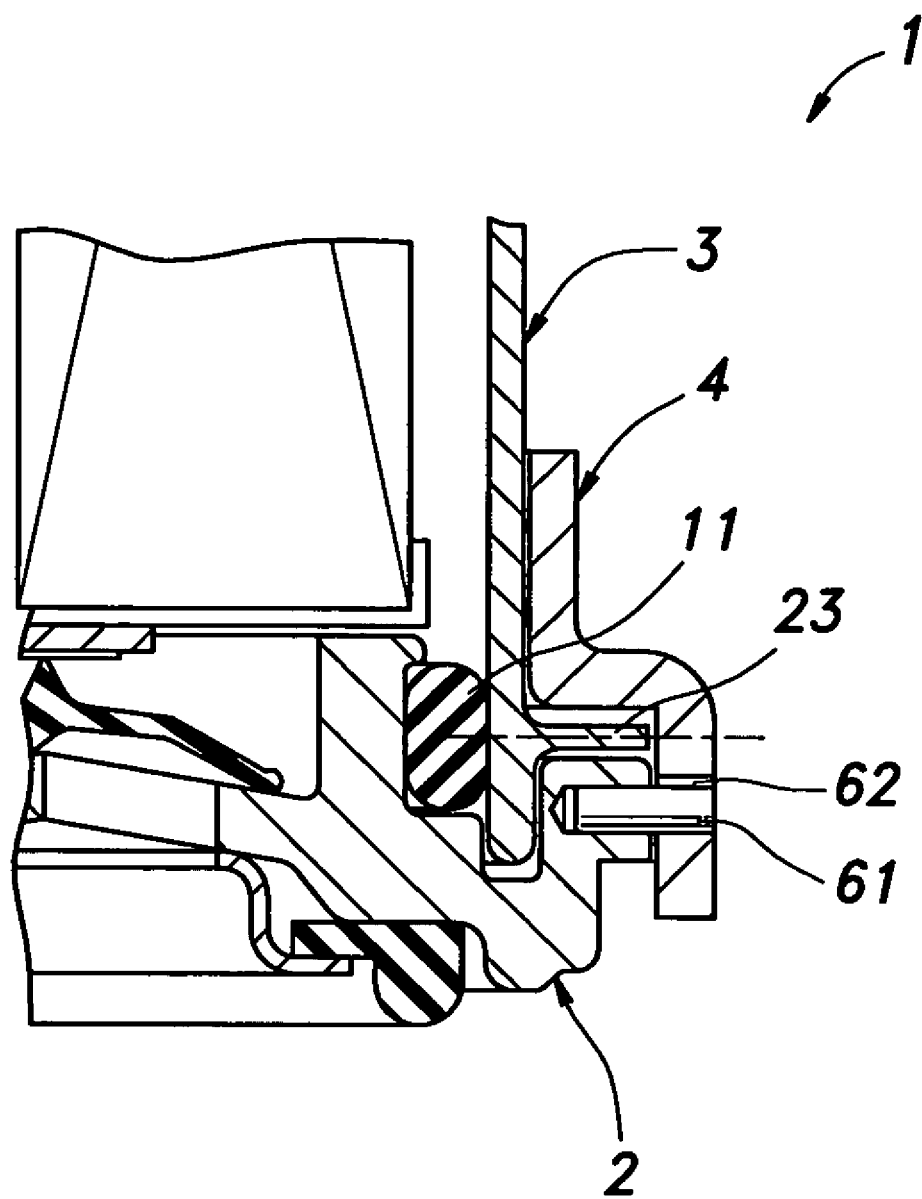
FIG. 36 is a fragmentary vertical sectional view of another modified embodiment of the casing of the second embodiment.

FIGS. 33 to 35 are fragmental vertical sectional views of modified embodiments of the casing of the first embodiment, and FIG. 36 is a fragmentary vertical sectional view of a modified embodiment of the casing of the second embodiment.

In the modified embodiment illustrated in FIG. 33, the oil filter 1 of the first embodiment is modified in such a manner that the radial outer flange 23 is moved downward so as to align centrally with the O ring 11. Thereby, in this modified embodiment, the deformation of the part of the casing 2 to which the maximum seal pressure is applied (the point of maximum seal pressure) is favorably controlled, and the seal performance of the oil filter 1 can be improved.

In the modified embodiment illustrated in FIG. 34, the oil filter 1 of the first embodiment is modified in such a manner that a seal ring 55 having lips 55*a* and 55*b* on either end is used instead of the O ring 11, and the radial outer flange 23 is located centrally opposite to the upper lip 55*a* along the axial direction of the oil filter 1 while the lower lip 55*b* is aligned with an end of the double walled portion 24. Thereby, in this modified embodiment, the deformation of the part of the casing 2 to which the maximum seal pressure is applied (the point of maximum seal pressure) is favorably controlled, and the seal performance of the oil filter 1 can be improved.

In the modified embodiment illustrated in FIG. 35, the oil filter 1 of the first embodiment is modified in such a manner that the casing 2 is made of relatively thick plate of steel, aluminum or the like and the radial flange 23 is made to extend from the lower end of the casing 2 while the double walled portion 24 is eliminated. Thereby, in this modified embodiment, the work steps of the stamp forming process for the casing 2 can be reduced.

In the modified embodiment illustrated in FIG. 36, the oil filter 1 of the first embodiment is modified in such a manner that the casing 2 is made of injection molded engineering plastic material or a stamp formed aluminum alloy, and the radial outer flange 23 is formed as a rib extending from the outer periphery of the casing 2. The radial outer flange 23 is located so as to centrally align with the O ring 11 along the axial direction of the oil filter 1 to further improve the sealing performance. This allows the manufacturing efficiency of the casing 2 to be improved without compromising the sealing performance and the work efficiency at the time of disassembling and assembling the oil filter 1.

This concludes the description of the concrete embodiments of the present invention, but the present invention is not limited by the foregoing embodiments and modified embodiment, and can be further modified over a wider range. For instance, although the foregoing embodiments were applied to reusable oil filters for automotive engines, the present invention can also be applied to oil filters and fuel filters for marine engines and industrial engines and to various containers other than filters. The configurations, materials and forming methods for the components such as the casing, lid and lock ring can be selected freely. Forged steel products, die cast aluminum products and injection molded plastic products can also be used, for instance. The seals such as the gasket and O ring are not necessarily indispensable. Furthermore, the modes of fastening the lid and lock ring together can be freely modified without departing from the spirit of the present invention.

The contents of the original Japanese patent application on which the Paris Convention priority claim is made for the present application are incorporated in this application by reference.

The invention claimed is:

1. A container having a detachable lid, comprising:

a cup-shaped cylindrical casing having a closed upper end, an open lower end and a radial outer flange extending from the open lower end thereof, wherein the casing is made of stamp formed steel plate and the open end thereof comprises a double walled portion formed by folding back the steel plate of the open end back onto an outer surface of a main part of the casing, the radial outer flange being formed as an extension of the folded back steel plate;

a disk-shaped lid closing the open end of the casing and provided with a plurality of engagement portions provided on an outer periphery of the lid at a prescribed angular interval; and an annular lock ring having a flange pressuring portion that engages an end surface of the radial outer flange to pressurize the radial outer flange against a peripheral part of the lid and a plurality of engagement portions formed at positions of the lock ring corresponding to the engagement portions of the lid;

wherein each engagement portion of the lock ring engages a corresponding one of the engagement portions of the lid, and one of the mutually engaging engagement portions of the lock ring and lid is provided with a guide slot while the other of the mutually engaging engagement portions of the lock ring and lid is provided with an engagement projection received in the guide slot, the guide slot being provided with a first section extending substantially in parallel with an axial line of the casing and a second section extending substantially laterally from the first section;

wherein the engagement portions of the lock ring are arranged at a regular angular interval, and the engagement portions of the lid are arranged at a same angular interval;

wherein the lock ring comprises an annular peripheral wall extending downward from an outer edge of the flange pressuring portion of the lock ring and having an inner diameter greater than outer diameters of the radial outer flange and lid, and the engagement portions of the lock ring comprises engagement projections projecting radially inwardly from an inner circumferential surface of the peripheral wall;

the radial outer flange being provided with notches that permit passage of the engagement projections of the lock ring in an axial direction; and the engagement portions of the lid comprising the guide slots, the first and second sections of each guide slot being defined by a notch and a rim formed in a periphery of the lid, respectively.

2. The container having a detachable lid according to claim 1, wherein the folded back steel plate is folded back onto the outer surface of the main part substantially without any gap between them.

3. The container having a detachable lid according to claim 1, wherein the lid is provided with a concentric annular seal support wall projecting upwardly and located slightly inwardly of an outer periphery of the lid, and an annular seal is interposed between an outer circumferential surface of the seal support wall of the lid and an inner circumferential surface of the double walled portion of the casing.

4. The container having a detachable lid according to claim 1, wherein the radial outer flange aligns with a part of the annular seal with respect to an axial direction.

5. The container having a detachable lid according to claim 1, wherein the lid is made of stamp formed steel plate.

6. The container having a detachable lid according to claim 1, wherein the lid is provided with an annular upright peripheral wall extending upwardly and closely surrounding the outer circumferential surface of the double walled portion of the casing.

7. The container having a detachable lid according to claim 6, wherein the peripheral wall at least partly overlaps with the annular seal with respect to an axial direction.

8. The container having a detachable lid according to claim 1, wherein the lid is provided with an annular recess on an upper surface thereof that receives a free end of the double walled portion of the casing.

9. The container having a detachable lid according to claim 8, wherein the lid is provided with an annular projection on a lower surface thereof at a radial position substantially corresponding to the annular recess.

* * * * *